(12) United States Patent
Czebatul et al.

(10) Patent No.: US 6,481,467 B2
(45) Date of Patent: Nov. 19, 2002

(54) POWERED BAND CLAMPING UNDER ELECTRICAL CONTROL

(75) Inventors: Philip A. Czebatul, Denver, CO (US); Hans R. Hinnen, Wheatridge, CO (US); Miklos B. Marelin, Aurora, CO (US)

(73) Assignee: Band-It-Idex, Inc., Denver, CO (US)

( * ) Notice: Subject to any disclaimer, the term of this patent is extended or adjusted under 35 U.S.C. 154(b) by 0 days.

(21) Appl. No.: 09/809,231

(22) Filed: Mar. 15, 2001

(65) Prior Publication Data

US 2002/0129866 A1 Sep. 19, 2002

(51) Int. Cl.[7] ................................................. B21F 9/02
(52) U.S. Cl. ........................................ 140/83.2; 100/32
(58) Field of Search ............................... 140/93.2, 93.4, 140/123.6; 100/32

(56) References Cited

U.S. PATENT DOCUMENTS

| | | | | |
|---|---|---|---|---|
| 1,565,865 A | * | 12/1925 | Ragona | 100/32 |
| 1,600,833 A | * | 9/1926 | McChesney | 140/93.2 |
| 2,007,002 A | * | 7/1935 | Porter | 140/93.4 |
| 4,934,416 A | | 6/1990 | Tonkiss | 140/93.2 |
| 5,146,847 A | * | 9/1992 | Lyon et al. | 100/32 |
| 5,163,482 A | | 11/1992 | Wolcott | 140/123.6 |
| 5,566,726 A | | 10/1996 | Marelin | 140/123.6 |
| 6,302,157 B1 | * | 10/2001 | Deschenes et al. | 140/93.2 |

OTHER PUBLICATIONS

Band–it, A Unit of IDEX Corporation, "Operators Manual Repair Parts List Automatic S350", 38 pages, 1999.
IDEX Corporation, "Automatic Air Tool S350", p. 15, 2000, Band–It The Clamping Experts, 7/00.

* cited by examiner

Primary Examiner—Lowell A. Larson
(74) Attorney, Agent, or Firm—Sheridan Ross P.C.

(57) ABSTRACT

Tensioning of a band clamp about an object under electrical control is provided using a control system operably connected to a banding system. The banding system includes a number of mechanical components involved with tightening, cutting and locking the band clamp, as well as removing a tail portion thereof. The control system is operably connected to the assemblies of the banding system to automatically control at least certain operations associated with performing the functions of the apparatus. The banding system includes: a band tightening assembly including a mandrel about which the tail portion can be wrapped during the band tightening operation; a band cutting/locking assembly including a removable cutting device used in forming the lock and severing the tail portion; and a band ejection assembly used in removing the severed tail portion from the apparatus. The control system preferably includes a load cell that outputs an electrical signal related to the actual tension being applied to the band clamp during the tightening operation. The control system also includes an input/output device for receiving and outputting information related to the functions performed by the banding and control systems.

36 Claims, 15 Drawing Sheets

US 6,481,467 B2

POWERED BAND CLAMPING UNDER ELECTRICAL CONTROL

FIELD OF THE INVENTION

The present invention relates to clamping objects and, in particular, tensioning band clamps about hoses using electrical control.

BACKGROUND OF THE INVENTION

Many types of band clamps have been devised or advanced for use in clamping to objects, such as hoses, pipes, poles, cables and the like. Common band clamps can be provided to the user in pre-formed loops in which one or more generally circular wraps are already formed. Such a band clamp can be used with objects about which the one or more loops can be located and then subsequently tightened about the object to firmly hold the band clamp to the object. Common types of band clamps also include those having a free end that is initially wrapped about the object being clamped. Band clamps usually have a buckle or other locking-type element through which one or more wraps of the band are made. The buckle can be useful in creating a lock for the band clamp after it is properly tightened about the object.

In conjunction with tightening or tensioning the band clamp after it is placed about the object, various tools have been implemented or disclosed that are intended to enhance or facilitate the tightening operation. In many instances, such tools are beneficial in cutting a tail portion of the band clamp after it has been tightened and in creating a desired lock so that unwanted release of the band clamp does not occur. Tools that perform the tightening, locking and cutting functions can be primarily manual, pneumatic or electrical in nature, In the case of pneumatic or electrical tools used for such purposes, the power generated results in these functions being accomplished with limited or reduced physical efforts required by the operator. Band tightening tools that are pneumatic or electrical are usually semiautomatic in that the operator of such a tool is required to perform some, but not all, of the tasks or functions associated with providing a band clamp about an object. Manual tasks that remain can include locating the band clamp about the object and inserting or otherwise locating the band clamp relative to the tool so that the tool can perform one or more of its tightening, locking and cutting functions. In one known pneumatic band tightening apparatus, a desired tension can be set for the band clamp about the object. After this is done, a pneumatic cylinder is activated to pull on the band until the desired band tension is reached. Pneumatic control can also be involved with cutting the band tail portion after the band clamp is tightened and which can also involve forming the lock that prevents unwanted release of the band clamp. When using electrical power with a band clamp, it is known to provide an electric motor that drives a gearing mechanism to which the band clamp is connected for use in tightening the band about the object.

Although different tools have been designed for use with band clamps, it would be advantageous to provide a tool, particularly one that relies on electrical power, that achieves greater control over the band clamping operations. Such a tool should be effective and efficient in tightening the band clamp, forming the band clamp lock and removing the severed tail portion after the band clamp is tightened. Furthermore, it would be beneficial for such a tool to be easily used by the operator in connection with positioning the object to be clamped and insertion, or otherwise joining, of the band clamp to the tool.

SUMMARY OF THE INVENTION

The present invention relates to an apparatus that electrically controls tightening a band clamp, cutting a clamp tail after the band clamp is tightened including as part of creating a lock for the band clamp and removing the clamp tail from the apparatus. Generally, the apparatus includes a banding system and a control system. The banding system essentially includes mechanical components or hardware for implementing the tightening, cutting/locking, and clamp tail removal functions associated with providing the band clamp about an object, such as a hose. The control system is essentially comprised of hardware components, but could include software, that controls these functions or operations. The control system can be characterized as including a control assembly and an input/output device. The input/output device can comprise one or more audible indicators and/or visual displays for providing desired information to the operator during use of the apparatus. In a preferred embodiment, a foot switch is included that must be activated at all times in order to continue operation of the apparatus. When the foot switch is released, the apparatus is deactivated. The input/output device can also include a keypad having a number of keys or input elements useful in providing desired inputs that are used by the control system, such as a desired or predetermined tension that is to be applied to the band clamp.

The control assembly is in electrical communication with the input/output device and includes an electric motor that is operably connected to a band tightening assembly. When a band clamp is prepared for tightening about an object and the electric motor is activated, the tightening of the band clamp about the object occurs. The control assembly also has a tension monitoring device that outputs data or other information related to the current band clamp tension. Preferably, the tension monitoring device includes a load cell assembly including a load cell that essentially translates the detected band clamp tension to an electrical signal. The electrical signal is received by signal conditioning circuitry that suitably prepares signals, such as the actual tension related signal for subsequent processing. In that regard, the control assembly includes processing/logic circuitry involved with determining whether the predetermined tension has been reached. After the predetermined tension is obtained, the control assembly causes the tightening of the band clamp to be discontinued, such as by de-activating the electric motor. The control assembly can also include a number of sensors including sensors related to detecting events associated with starting the tightening operation and associated with removal of the clamp or band tail after the cutting/locking operations. Referring to the band tightening assembly, it preferably includes a mandrel about which portions of the band clamp are wrapped as the mandrel is turned using the electric motor and a gear mechanism. The band tightening assembly also includes a gripper mechanism that firmly grips the end portions of the band clamp, which end portions are inserted into the apparatus. The gripper mechanism has an open position for receiving such band clamp portions prior to tightening the band clamp about the object. The gripper mechanism also has a closed position, which is maintained during tightening of the band clamp. In a preferred embodiment, the gear mechanism has at least one gear and the load cell of the load cell assembly is positioned parallel to that gear. The load cell can also be attached to a thrust member, which is joined to the one gear, and the load cell receives an input related to the actual tension of the band clamp using a force associated with the one gear on the thrust member.

The banding system also includes a band cutting/locking assembly that is activated or otherwise caused to operate after the band tightening operation is completed. The band cutting/locking assembly can include electrical control, such as an electric motor, that initiates a cutting device to sever the clamp tail from the tightened band clamp. The cutting device includes a cutting head that performs the cutting operation. The cutting device is preferably removable from the apparatus so that one of a number of selectable cutting devices can be removably connected to the apparatus for providing a desired or particular cutting/locking of the band clamp.

The banding system also includes a band ejection assembly involved with removal of the severed clamp tail from the apparatus. An ejector cup of the band ejection assembly is positioned about the mandrel when the band clamp is being tightened. The ejector cup is moved away from the mandrel under control of the control system in order to remove the clamp tail from the apparatus. In one embodiment, the ejector cup has a slot through which the severed clamp tail can escape once the ejector cup is moved laterally away from the mandrel.

In accordance with using the apparatus with a band clamp, appropriate inputs are input to the input/output device, such as the desired tension to be applied to the band clamp. Other inputs that could be entered include the type, width and material of the band clamp, which information can be used by the apparatus in providing the desired tension. Additionally, the object, such as a hose, and a band clamp properly positioned thereabout are suitably placed relative to the apparatus including inserting a free end of the band of the band clamp into the gripping mechanism of the band tightening assembly. With regard to proper insertion, the mandrel is at its home position, which can be determined using a visual and/or audible indicator of the input/output device. After the proper set-up is established, the apparatus is activated including applying power to the electric motor using the foot switch. Rotation of the shaft of the electric motor results in rotation of the mandrel and the gripper mechanism that is operably connected to the mandrel. During the initial rotation of the mandrel, the gripper mechanism closes to firmly grip the free end of the band clamp. As rotation of the mandrel continues and the band clamp is being tightened, a curved clamp tail is created, which is positioned about the outer surface of the mandrel within the ejector cup of the ejection assembly. As the band clamp continues to be tensioned, the control assembly continuously compares the current actual tension of the band clamp with the desired tension that was previously input. When the actual tension equals, or substantially equals, the predetermined tension, the tightening operation of the apparatus is stopped including turning off the power to the electric motor. In obtaining the current actual tension, an electrical signal output by the load cell is received by the signal conditioning circuitry and the processing/logic circuitry of the control assembly in connection with comparing this actual tension related signal with the magnitude of the desired tension.

Depending on the desired tension to be applied to the band clamp, the clamp tail can make less than one wrap, substantially one wrap or more than one wrap about the mandrel outer surface. When the clamp tail is wrapped more than once about the outer surface of the mandrel, tightening of the band clamp continues past the home position of the mandrel. In such a case, the processing/logic circuitry of the control assembly is involved with determining that the actual tension is at least equal to an override tension indicative of the fact that the band tightening operation should continue since the desired tension has not yet been reached. In another situation as well, the electric motor is not powered off when the mandrel is at the home position. In this situation, the home position is detected after the tightening operation is complete and the clamp tail has been severed. The electric motor must be activated for a short period of time to enable the clamp tail to be properly ejected. However, the mandrel may reach the home position during this short period of activation. A timer is employed in determining that the electric motor has not been powered on for a predetermined interval of time. Until that predetermined interval of time is reached, power continues to be applied to the motor past the home position so that the clamp tail can be properly ejected.

After the band clamp has been tightened, the next steps involving the apparatus include using the band cutting/locking assembly to sever the clamp tail and to form the desired lock using the cutting device having the selected or predetermined cutting head. In that regard, the motor of the band cutting/locking assembly is activated to cause an actuator assembly to move the cutting device in a manner that causes the cutting head to sever the clamp tail. With regard to one embodiment of a particular type of band clamp, the clamp tail to be severed is released a short distance by reversing the direction of the shaft of the electric motor. The operator then moves this particular band clamp to a desired position and subsequently the cutting device is caused to move in order to sever the clamp tail. Generally, a number of the same kind of band clamps are to be joined with an associated one of a number of objects. A removable cutting device is selected for this number of particular band clamps. When another set of different band clamps are employed requiring a different cutting device, the currently used cutting device can be replaced with the different cutting device.

At the completion of the operation involving the cutting of the clamp tail and forming the lock on the band clamp, the apparatus next proceeds to implement the steps that eject or otherwise remove the severed clamp tail from the apparatus. During the band tightening steps, the ejector cup of the band ejection assembly is located over the mandrel. After the clamp tail is severed, the ejector cup is moved laterally away from the mandrel using an ejection solenoid that is activated by the processing/logic circuitry of the control assembly. After the ejector cup has moved laterally a sufficient distance, the severed clamp tail is able to exit or escape through the slot in the ejector cup. With the removal of the severed clamp tail, the ejector cup can be re-positioned over the mandrel by movement thereof in the opposite lateral direction.

With the completion of the tightening, cutting, locking and clamp tail removal operations, the next band clamp can be provided for clamping about another object. The necessary parameters, such as the desired tension to be applied, may be the same so that the previous inputs are used again. It may be necessary to locate the mandrel at its home position so that the gripper mechanism is open to receive the free end of the next band clamp, which is located about the next object to be clamped. After doing so, the foot switch can be activated and the same operations previously described can be accomplished.

Based on the foregoing summary, a number of salient features of the present invention are noted. Substantial electrical controls are provided for tightening, cutting, locking and clamp tail removal in connection with the operations for properly joining a band clamp to an object. Such greater electrical control includes the capabilities of providing various inputs and obtaining information by means of different visual and audio outputs. In conducting the tensioning of the band clamp, a strong grip of the band occurs using an openable gripper mechanism having a non-linear gripping surface contacted by the band portions. This design insures that no slipping of the band occurs during the tensioning thereof. A load cell is utilized for use in indicating the current actual tension being applied to the band clamp. The load cell is arranged with one or more gears of a gear mechanism to eliminate, or at least reduce, the effects of the gear mechanism on the measured actual tension. In that regard, wear, degree of lubrication, and other factors that might affect operation of the gear mechanism do not negatively impact the measured actual tension. The cutting device of the band cutting/locking assembly is removable. Consequently, different, selected cutting heads can be employed to provide various types of cutting/locking features. The band tightening assembly can include a mandrel about which the clamp tail is wrapped or otherwise positioned so that a curved tail portion results, instead of a relatively straight tail portion, thereby reducing the space that is occupied by the clamp tail to be severed. Additionally, the band ejection assembly effectively removes the severed clamp tail from the apparatus by an efficient lateral movement of an ejector cup that allows the severed clamp tail to escape from a slot in the ejector cup.

Additional advantages of the present invention will become readily apparent from the following discussion, particularly when taken together with the accompanying drawings.

DETAILED DESCRIPTION

Figure 1:
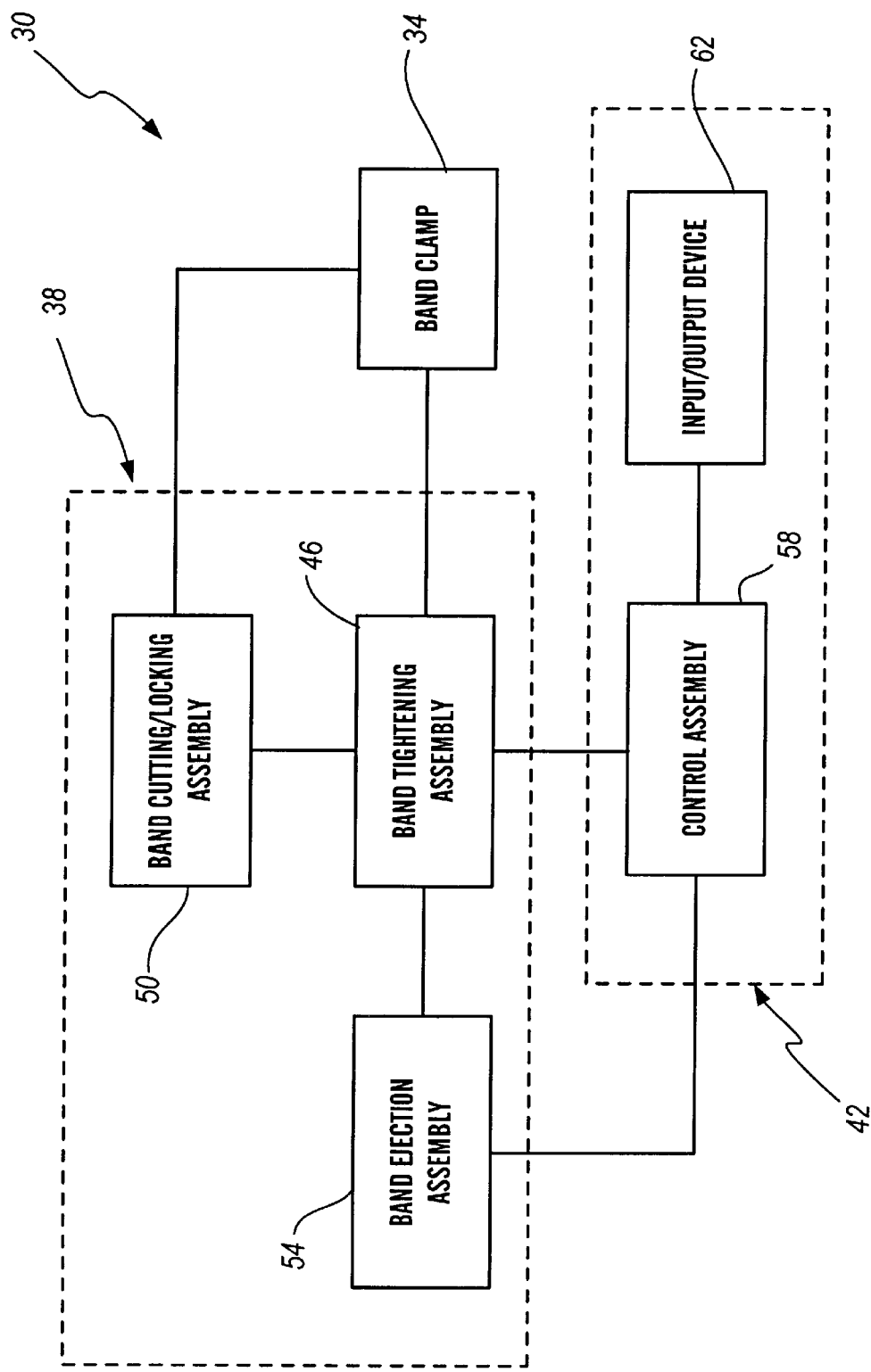
FIG. 1 is a block diagram that illustrates the major components of the apparatus for implementing the band tightening, cutting, locking and ejection operations of the present invention.

With reference to FIG. 1, an electrically controlled apparatus 30 is illustrated in a block or functional diagram that tightens a band clamp 34 to a desired tension based on an input from the operator or user. The apparatus includes a banding system 38 and a control system 42. The banding system is 38 generally involved with mechanical-related operations for providing the band clamp 34 about the object, such as a hose, that is being tightened. The control system 42 is generally involved with electrically controlling the banding system 38 so that it properly operates to tighten the band clamp 34 about the object.

The banding system 38 includes a band tightening assembly 46 that receives a free end of the band clamp 34. When activated, the band tightening assembly 46 acts to tension or tighten the band clamp 34 by pulling thereon. Preferably, in conjunction with the pulling, the free end of the band clamp 34, together with portions integral therewith, are caused to be wrapped around or rotated about so that a resulting clamp or band tail is curved. Depending on the magnitude of the tension being applied to the band clamp 34, the amount or degree of wrapping can be greater than 180° including multiple (greater than 360°) wraps, or portions of single or multiple wraps.

The banding system 38 also includes a band cutting/locking assembly 50 that is used to cut the clamp tail or scrap from remaining portions of the band clamp 34 after the desired tension is reached and lock the band clamp 34 to the object. In one embodiment, at least certain operations associated with the band cutting locking assembly 50 are manually controlled by the operator, with other operational steps being automatically controlled. The banding system 38 can also include a band ejection assembly 54 that functions to remove the clamp tail after it has been severed or cut from remaining portions of the band clamp 34 by the band cutting/locking assembly 50.

The control system 42 preferably includes a control assembly 58 and an input/output device 62. The control assembly 58 electrically communicates with the banding system 38, such as with parts or components of the band tightening assembly 46. The control assembly 58 can also electrically communicate with the band ejection assembly 54 and, particularly where the band cutting/locking assembly 50 has at least some measure of automatic control, can also communicate with it. The input/output device 62 electrically communicates with parts/components of the control assembly 58 to provide desired inputs to and receive outputs from the control assembly 58.

Figure 2:
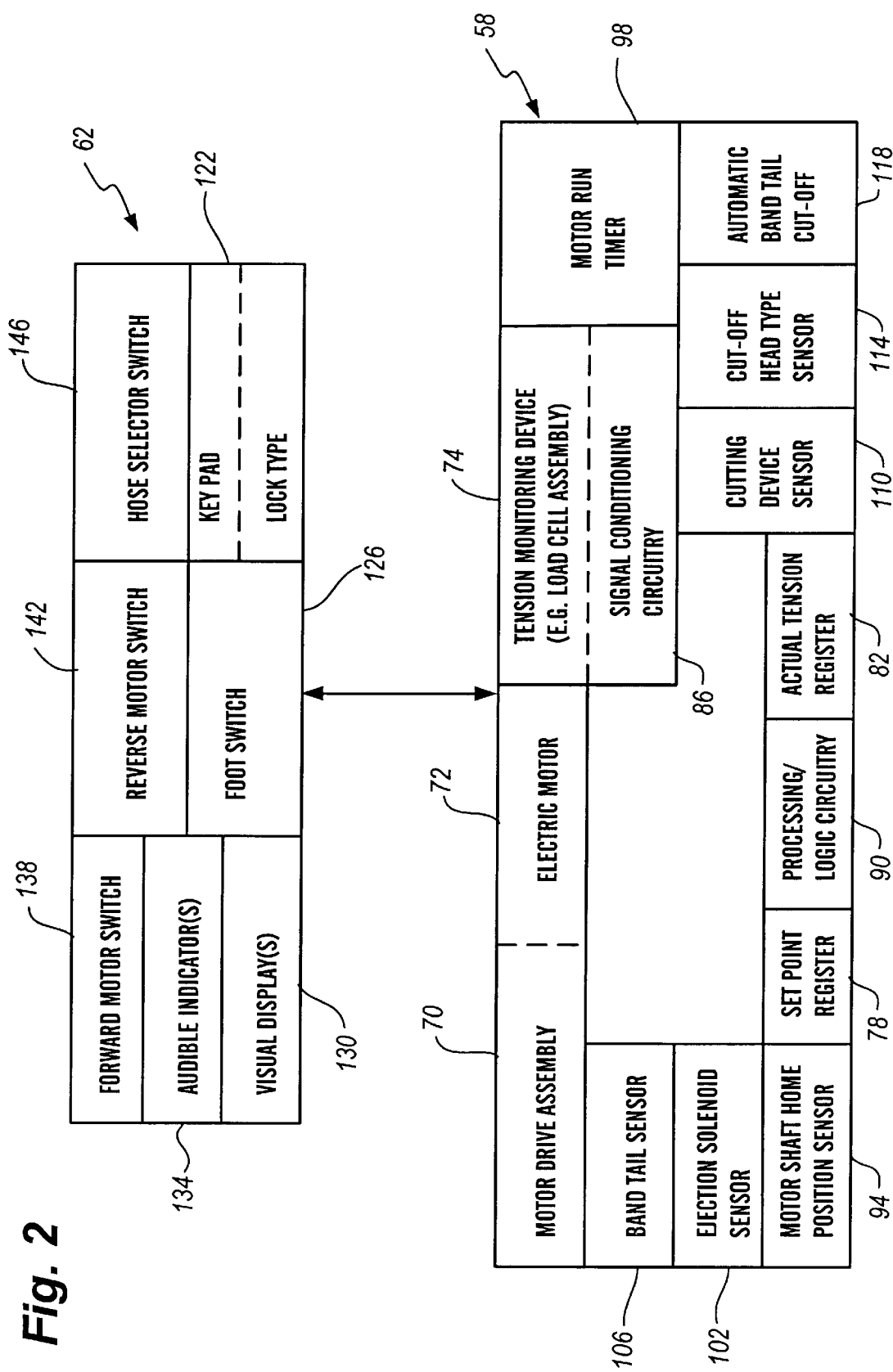
FIG. 2 is a block diagram illustrating components of the control system of the present invention including those of the control assembly and the input/output device

With reference to FIG. 2, one embodiment of the control assembly 58 and an input/output device 62 is diagrammatically illustrated. It should be understood that each of the control assembly 58 and input/output device 62 illustrated in FIG. 2 could have more or fewer components than those that are illustrated in order to achieve the main objectives of the present invention. Consequently, not all parts/components illustrated in FIG. 2 are critical or necessary to achieve the basic electrical band tightening control sought by the present invention. The control assembly 58 of FIG. 2 includes a motor drive assembly 70 that includes an electric motor 72. The motor drive assembly 70 can include a full wave, four quadrant, regenerative SCR drive. The input voltage can be from a standard 115 VAC line. The electric motor 72 can be a ¾ horsepower DC motor. The output of the electric motor 72 is a driven shaft that is connected to the band tightening assembly 46. With respect to controlling operation of the motor drive assembly 70 including its electric motor 72, a tension monitoring device 74 outputs a signal related to actual tension of the band clamp 34. The tension monitoring device 74 is also connected to components of the band tightening assembly 46. In a preferred embodiment, the tension monitoring device 74 includes a load cell assembly that receives a mechanically based input and outputs an electrical signal that is proportional to tension on the band clamp 34. The load cell assembly can include a strain gauge type load cell which measures clamp tension based on a reaction force associated with the band tightening assembly 46.

The control assembly 58 can also include a tension set point register 78 that is able to receive and store a desired tension magnitude or value that is input by the operator, with this desired or predetermined tension being the resulting tension that is to be applied to the band clamp 34. The control assembly 58 can also be involved with obtaining the actual tension and storing it in an actual tension register 82. The magnitude of the actual tension is measured using the load cell assembly whose output is applied to conditioning circuitry 86 that can include one or more appropriate amplifiers that amplify the signal and/or gain adjusting components. Processing/logic circuitry 90 is used in determining whether the desired band clamp tension is reached preferably by making a determination based on a comparison between the desired tension stored in the set point register 78 and the current magnitude of the actual tension that can be stored in the actual tension register 82. When the desired tension is reached, the motor drive assembly 70 including the electric motor 72 is de-activated so that the band tensioning assembly 46 discontinues its function of tensioning the band clamp 34.

The control system 58 can also include a home position sensor 94 that is used in determining that the shaft associated with the DC motor 72 of the motor drive assembly 70 is at a desired or home position. At this home position, the band tightening assembly 46 is located to receive the band clamp 34, i.e., the free end of the band clamp 34 is insertable for holding and subsequent tightening by the band tightening assembly 46. A motor run timer 98 can also be included with the control assembly 58. As will be discussed in more detail later in connection with its operation, the motor run timer 98 monitors the time that the electric motor of the motor drive assembly 70 is continuously on or operating.

The control assembly 58 also has a number of other sensors including an ejection solenoid sensor 102 associated with the band ejection assembly 54. The ejection solenoid sensor 102 is involved with monitoring the position of an ejection solenoid of the band tightening assembly 46. A b and tail sensor 106 can also be provided association with the band ejector assembly 54, which sensor 106 outputs a signal related to whether the band tail of the band clamp 34 has been removed after the band ejection assembly 54 has performed its operation. A cutting device sensor 110 can be included to monitor the position associated with the cutting device of the band cutting assembly 50 as will be further elaborated upon later herein. The control assembly 58 might also include a cut-off head type sensor 114 and/or automatic band tail cut-off device 118. The cut-off head type sensor 114 could be used in determining that a particular cutting head of the band cutting assembly 50, which provides a particular type of cut and/or locking of the band clamp 34, is present. The types of band cutting devices that might be incorporated will also be discussed in more detail later herein.

With continued reference to FIG. 2, the input/output device 62 includes a key pad 122 that the operator can use to input desired or predetermined magnitudes that can be processed or utilized, such as the magnitude of a desired or a predetermined tension for the band clamp 34. The key pad 122 can also include keys or other input elements for inputting identifying information (e.g. lock type) related to the band clamp 34. The band clamp 34 to be tightened around the object may require a particular cutting device and such a cutting device may cause a particular cut and lock to be formed on the band clamp 34. By way of example only, a first band clamp may have a first lock type that can be generally J-shaped in profile and is formed against the front face of the buckle of the band clamp, with a short lip being provided as part of the lock. In accordance with a second type of lock formed on a second band clamp, it can be formed by shearing against the inside of the buckle whereby, to open such a lock, unfolding and tearing of the band material is required. In a third example, a third band clamp can have a third type of lock which is formed by means of punching or otherwise deforming the band at the buckle of the band clamp. For the first type of lock, full tension is not achieved and requires the operator to assist in forming the lock. That is, a step down from full tension is conducted by reversing the electric motor 72 of the drive motor assembly 70. After the tension step down, the operator is involved with moving the band clamp 34 to continue the cutting and locking steps. In obtaining the second and third types of locks, full tension is achieved when the electric motor 72 is stopped and the operator is not involved with creating the lock.

The input/output device 62 can also be defined as including a foot switch 126 that is activated by the operator using his foot. The foot switch 126 is depressed and initiates a cycle by which the band clamp 34 is clamped to or tightened on the object. In one embodiment, the foot switch 126 must be continually depressed in order to continue with the cycle of tensioning the band clamp 34. If the foot switch 126 is not depressed or is deactivated during any time of the cycle, the tightening of the band clamp 34 stops. One or more visual displays 130 are also part of the input/output device 62, which visual displays 130 can be LEDs (light emitting diodes) and/or LCDs (liquid crystal displays) and these provide suitable information related to the operation of the apparatus 30, such as a display of the desired tension when a particular band clamp 34 is being tightened. Other information can be displayed, such as the LCD outputting a message that the ejection solenoid sensor 102 has output a signal indicative of a position of the band ejection assembly 54, when the band tail is being ejected or removed. Such a LCD could also display a message that the ejection failed when the removal of the band tail was not successful. One or more audible indicators 134 could also be included as part of the input/output device 62. For example, audible indication in the form of a pleasant buzzer sound of relatively short duration could be output when the desired tension is reached. Additionally, when the actual tension of the band clamp is not achieved within a predetermined percentage of the desired tension, a relatively unpleasant buzzer sound could be output, as well as a visual display to the effect that the band clamp 34 is "overtensioned" or "undertensioned", whichever is applicable.

The input/output device 62 can also include a number of switches, namely: a forward motor switch 138, a reverse motor switch 142 and a hose selector switch 146. The forward motor switch 138 enables the operator to manually control activation of the motor in a forward direction to cause the band tightening assembly 46 to continue to tighten the band under direct operator control. The reverse motor switch 142 allows the operator to manually reverse motor direction when desired or appropriate, such as in the case of the first type of lock being applied to the band clamp 34 and the need to step down from full tension in order to provide the lock for this particular band clamp 34. The hose selector switch 146 enables the operator to input information related to the object being clamped by the band clamp 34. For example, the object being clamped may be a relatively soft hose, a relatively hard hose, and a hose made of a metal material. Depending on the type of object selected using this hose selector switch 146, the procedure for tightening the band clamp 34 can change. As an example, the band clamp 34 might be positioned about a relatively soft hose for tightening. In connection with the procedure for tensioning the band clamp 34 about the relatively soft hose, tightening steps might be employed that include a delaying step by which the hose has time to move out from under the band clamp 34, or otherwise settle in place, before the continuing to apply tensioning. In such a case, more certainty may be realized in connection with achieving the necessary clamping at the selected, desired tension.

Figure 3:
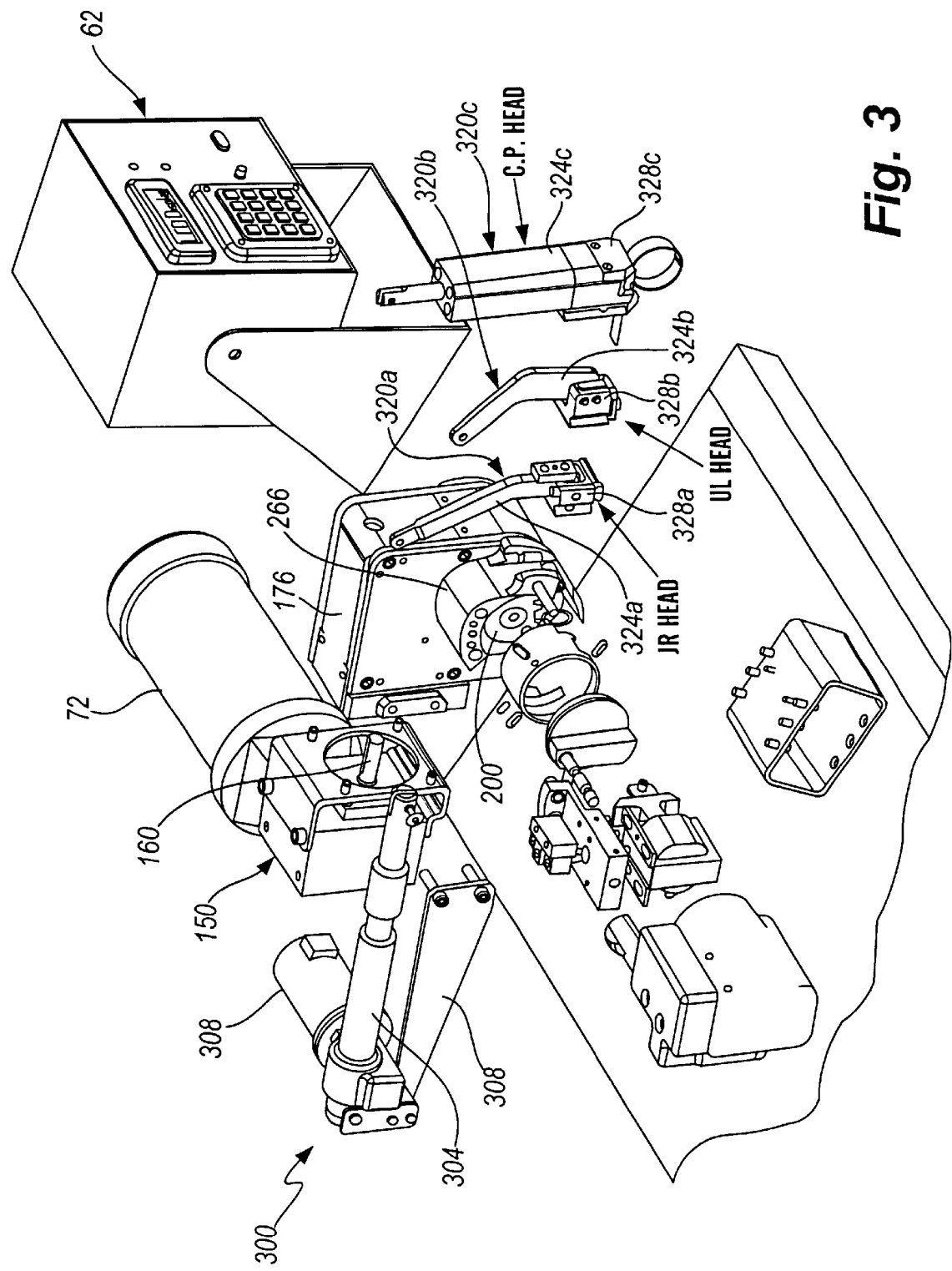
FIG. 3 is an exploded view of the apparatus that includes a number of cutting devices, with a selected one of them being part of the apparatus at one time.
Figure 4:
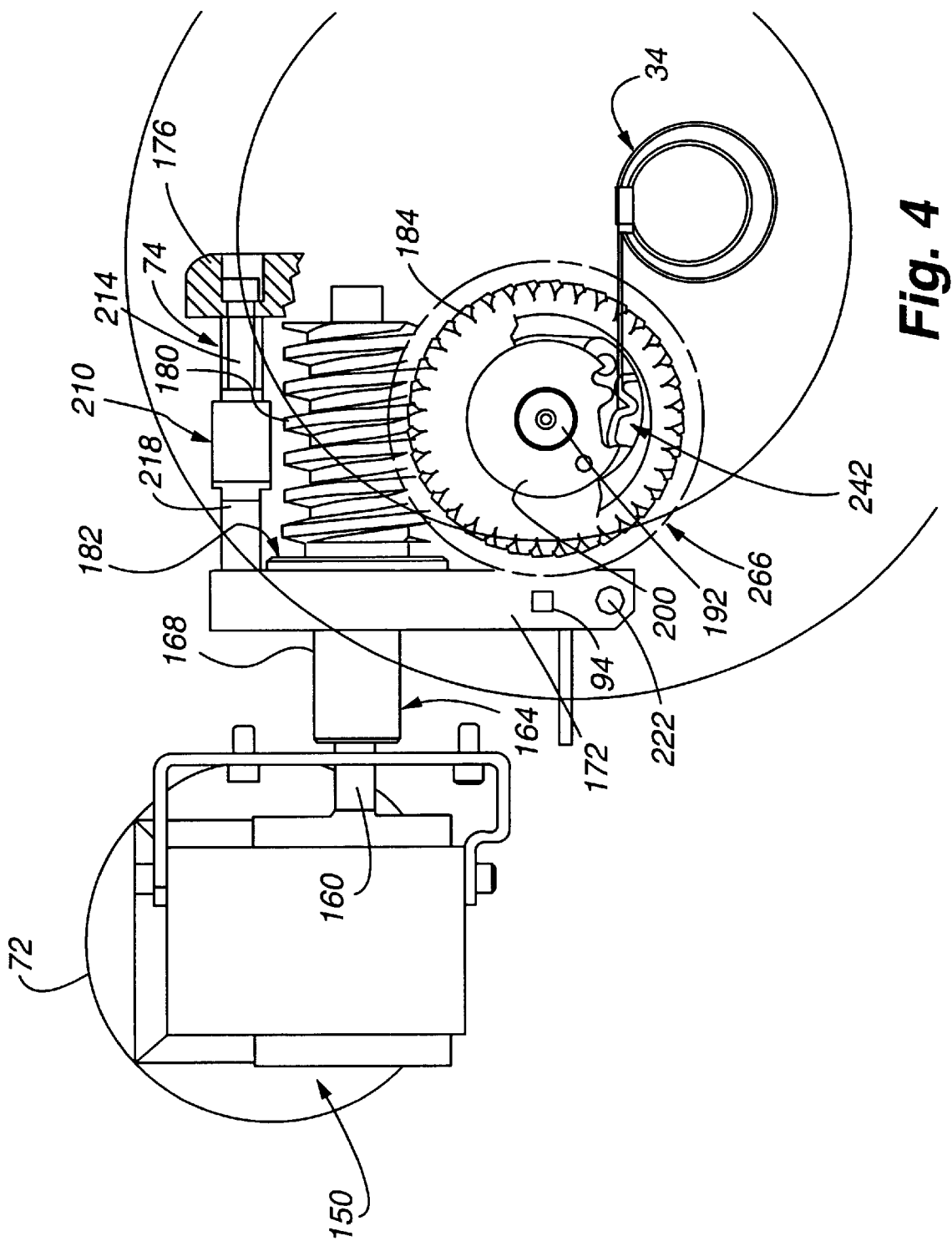
FIG. 4 is a side diagrammatic view that illustrates the arrangements among the electric motor, gear mechanism, load cell assembly and mandrel receiving the free end of the band clamp.
Figure 5:
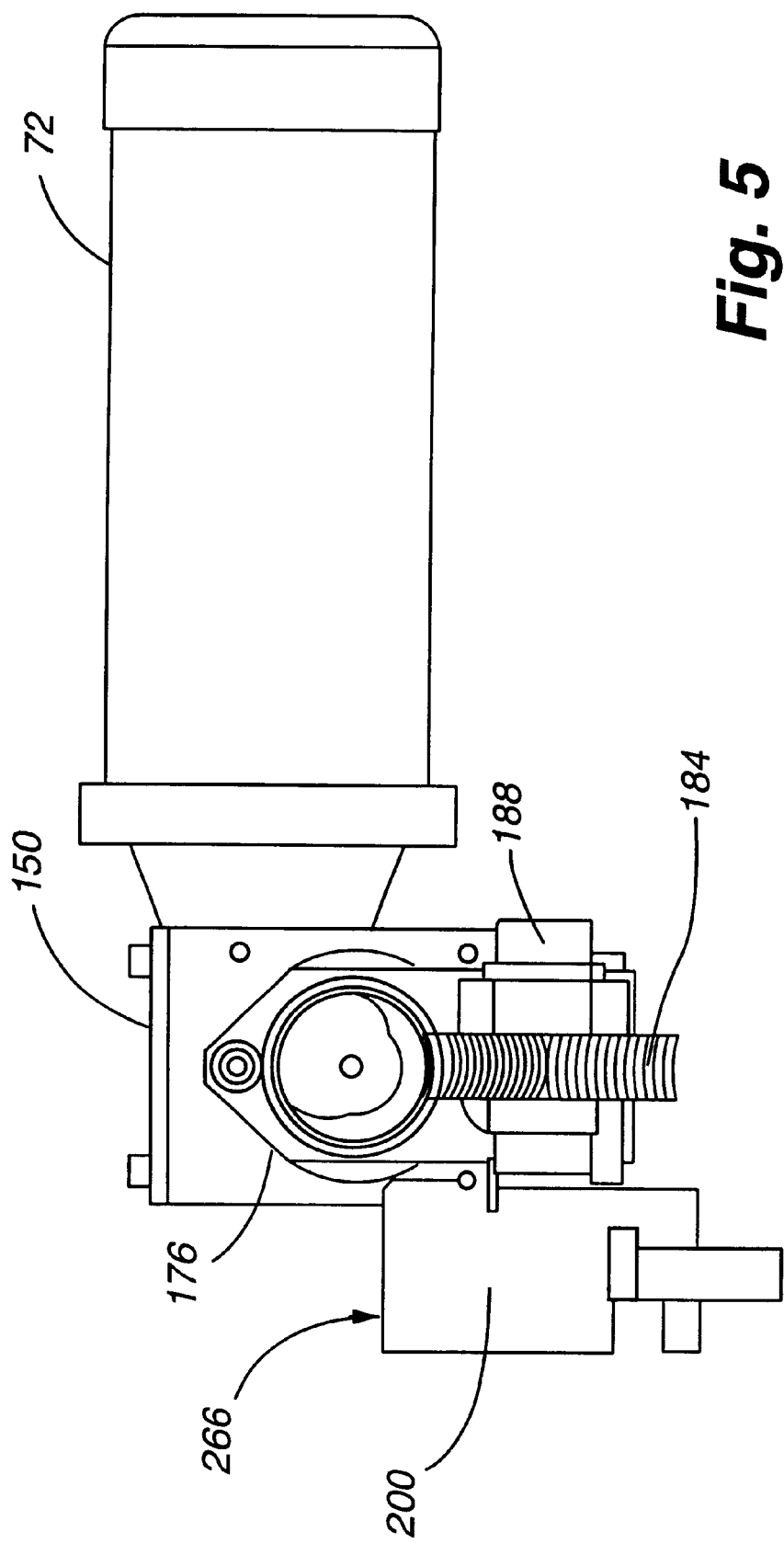
FIG. 5 is a front diagrammatic view of the band tightening assembly with the electric motor connected thereto.

With reference to FIGS. 3–5, an embodiment of the band tightening assembly 46 is described. The band tightening assembly 46 includes a gear reducer 150 connected to the motor shaft of the electric motor 72. The gear reducer 150 has a first coupling member 160 of a coupling sub-assembly 164, which also includes a second coupling member 168. The second coupling member 168 is connected to a thrust plate 172 of a tool frame 176 (FIG. 3). The thrust plate 172 is joined to the shaft of a worm drive 180, with the shaft being aligned with the coupling assembly 164. The worm drive 180 meshes with a worm gear 184. A gear or drive shaft 188 (FIG. 5) is connected to the worm gear 184 and is rotatable therewith. The drive shaft 188 is joined to a mandrel cross pin 192 so that the mandrel cross pin 192 turns and rotates when the gear shaft 188 is driven. The mandrel cross pin 192 is fixedly connected to a mandrel 200, which is directly involved with tightening the band clamp 34, as will be further explained just below. With regard to supporting the worm drive 180 and the thrust plate 172, the thrust plate has an opening that receives a thrust bearing 182.

With further reference to FIG. 4, the tension monitoring device 74 of the preferred embodiment is illustrated and includes the load cell assembly having a load cell 210 that is able to determine the axial force present on the worm drive 180. That is, the strain gauge type load cell 210 measures the clamp tension based on its position as it opposes the reaction force associated with the worm drive 180. When tension is applied to the band clamp 34, the torque is countered by the worm drive 180 and causes a pushing on the thrust bearing 182. In providing this function, the load cell 210 has a tool frame shaft 214 that is fixedly held to the tool frame 176. At the opposite end of the load cell 210, a thrust plate shaft 218 is fixedly connected to the thrust plate 172. The load cell 210 is electrically connected to the signal conditioning circuitry 86 for amplifying, removing noise, adjusting signal gain and/or otherwise conditioning the output signal from the load cell 210 so that the information or intelligence it contains can be suitably obtained using the processing/logic circuitry 90. In that regard, the load cell 210 is used in measuring the actual tension that the band clamp 34 is then being subject to. The tension monitoring device 74, such as the load cell assembly, is parallel disposed relative to the shaft of the worm drive 180 and is used to accurately measure the actual tension without regard to any current state or condition of the gearing including the worm drive 180 and the worm gear 184. That is, the same actual tension will be measured for each band clamp 34, even when tensioning one band clamp, the worm drive 180, for example, is not sufficiently lubricated, while it is sufficiently lubricated for one or more other band clamps 34, since the load cell 210 is not affected by the conditions of such components of the band tightening assembly 46. Because the load cell 210 can have some relatively minor, linear movement (e.g. 0.005 inch), it is desirable that such be compensated for by permitting slight pivotal movement of the thrust plate 172. This is accomplished by allowing the thrust plate 172 to pivot about the thrust plate pivot pin 222 so that any such linear movement of the load cell 210 is not constrained by its connection between the tool frame 176 and the thrust plate 172.

Figure 6:
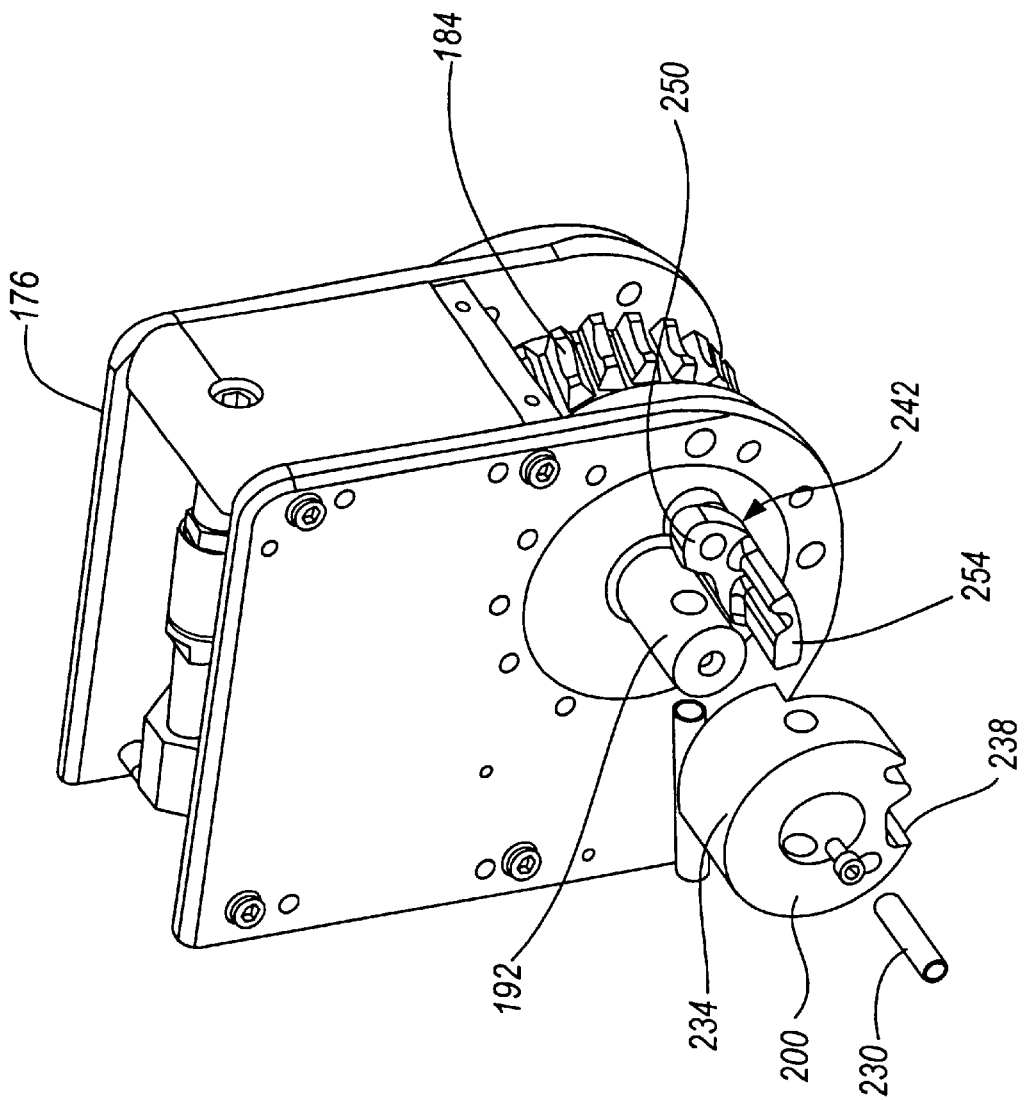
FIG. 6 is a exploded view that illustrates parts of the band tightening assembly including the mandrel connectable to a driven shaft.
Figure 7:
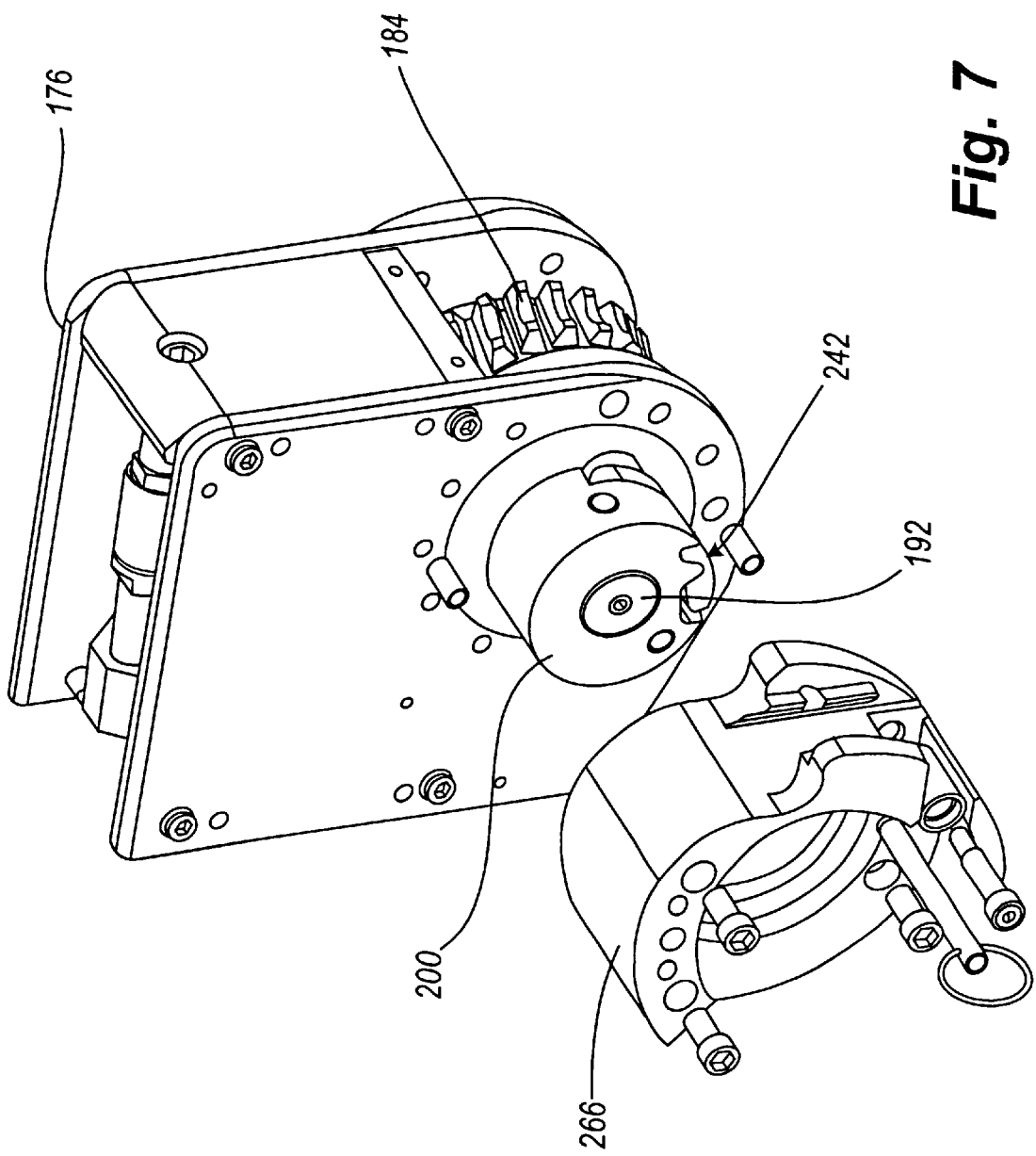
FIG. 7 is an exploded view illustrating parts of the band tightening assembly and the ejector cup of the band ejection assembly that can be positioned outwardly of the outer surface of the mandrel.

Referring now to FIGS. 6–10, further discussions directed to the band tightening assembly 46 are provided. As previously noted, the rotational movement of the worm gear 184 is applied to the mandrel cross pin 192 by means of the gear or drive shaft 188. As seen in FIG. 6, the mandrel 200 is connected to the mandrel cross pin 192 using the drive pin 230. The mandrel 200 has an outer surface or circumferential periphery 234 over which the band or clamp tail is wrapped around or located about during the tightening of the band clamp 34. In conjunction with gripping the clamp tail of the band clamp 34, the mandrel has a cut-out or jaw portion 238 formed in a circumferential part of the mandrel 200. The jaw portion 238 has a wave-shape and is formed in about a 45° section of the outer periphery 234 of the mandrel 200.

Figure 8:
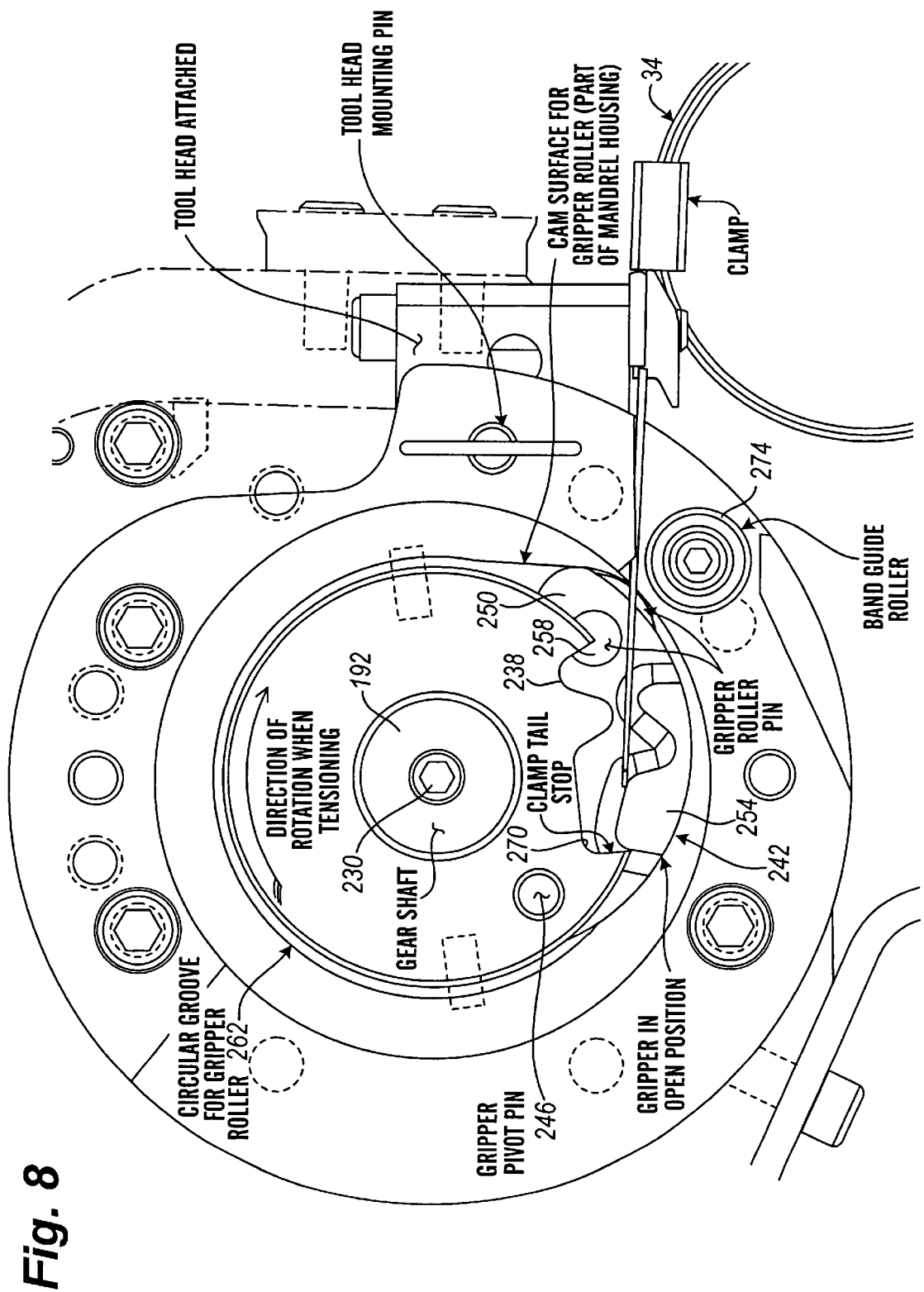
FIG. 8 is an enlarged, side diagrammatic view that illustrates the gripper mechanism. in the open position to receive the free end of the band clamp.
Figure 9:
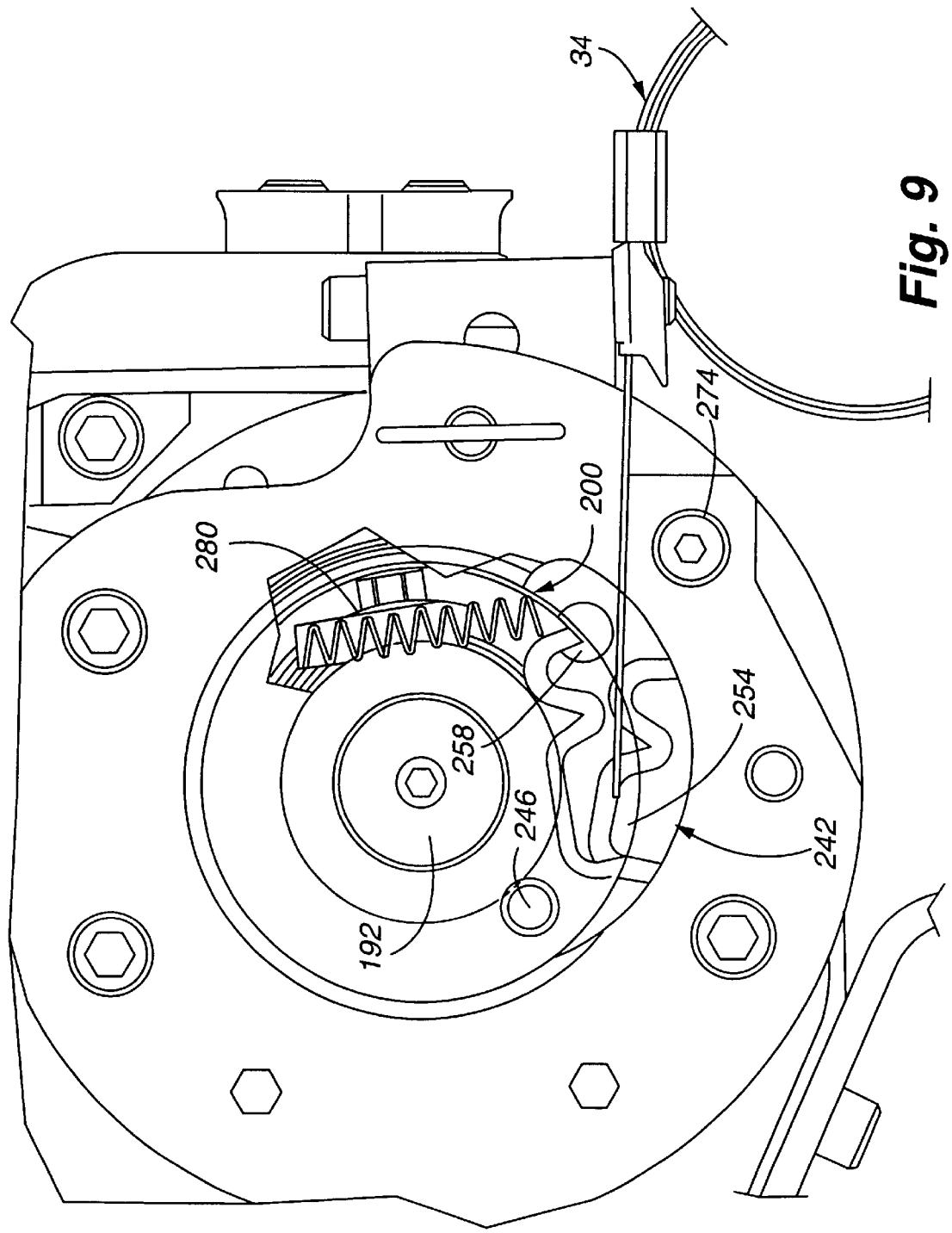
FIG. 9 is an enlarged, side diagrammatic view that illustrates a gripper spring used in controlling position of the gripper mechanism.
Figure 10:
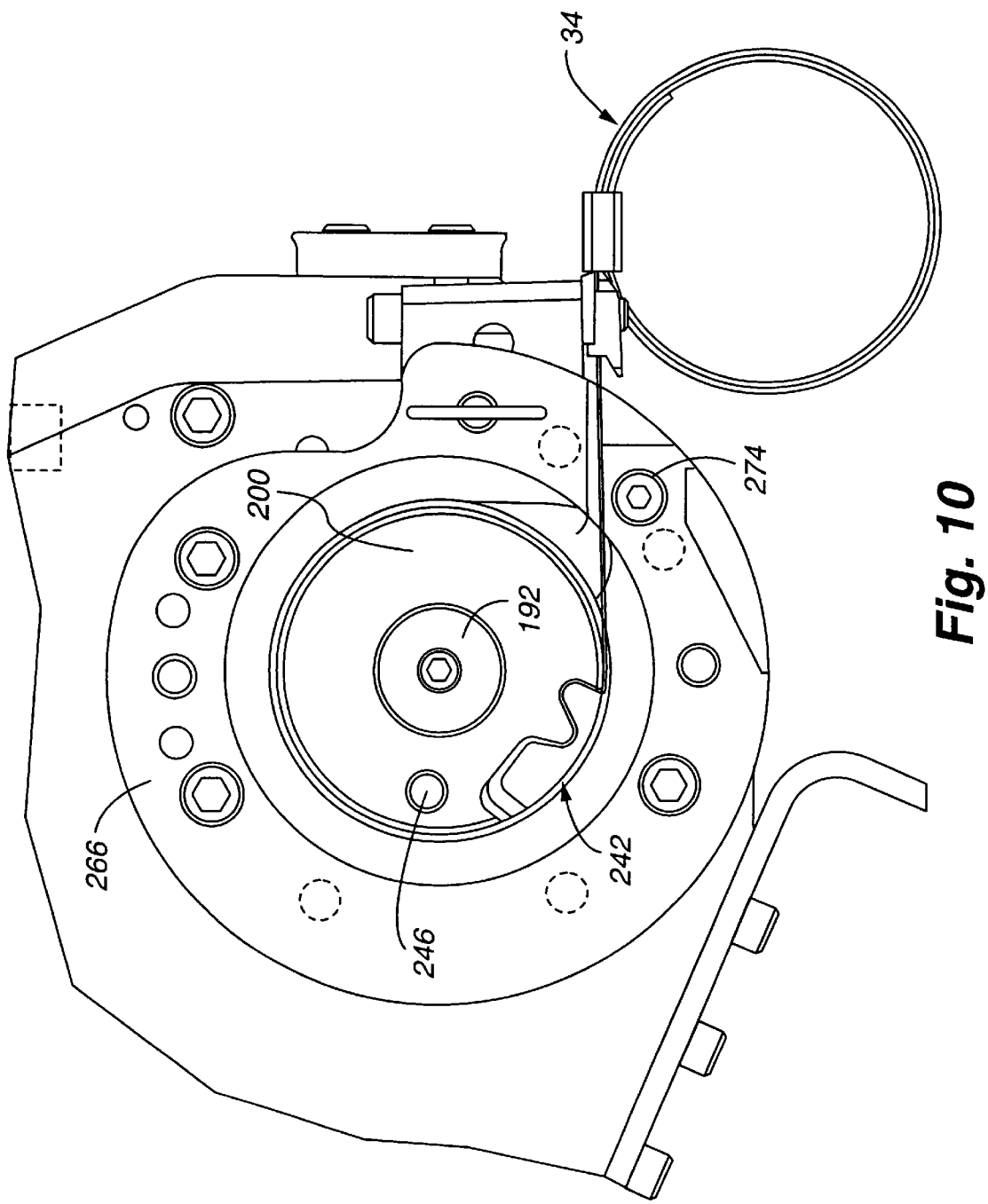
FIG. 10 is an enlarged, side diagrammatic view that illustrates the gripper mechanism in a closed position.

A gripper mechanism 242 is pivotally joined to the mandrel 200 using a gripper pivot pin 246. When the mandrel 200 rotates, such as during tensioning of the band clamp 34, the gripper mechanism 242 moves therewith. The gripper mechanism 242 includes a gripper body 250 and a gripper jaw 254. The gripper pivot pin 246 is connected adjacent to one end of the gripper body 250 and relatively adjacent to the opposite end of the gripper body 250 is the gripper roller pin 258. During movement of the gripper mechanism 242 with the mandrel 200, the gripper roller pin 258 moves along a groove or race 262 formed in a mandrel housing or cup 266 (e.g. see FIG. 3). This groove or race 262 defines a cam surface in the mandrel housing 266 at which the gripper jaw 254 separates from the jaw portion 238 of the mandrel 200. Consequently, an opening or gap exists between the jaw portion 238 and the gripper jaw 254 that has a size to allow the band or clamp tail to be inserted in connection with preparing the band clamp 34 for tightening about an object, such as a hose. When the gripper mechanism 242 is in this open position, a gripper spring 280 (FIG. 8) thereof acts to assist in the positioning or forcing the gripper body 250 open at this cam surface. Once the band tail including its free end are positioned in the opening that is created, the band tightening can occur whereby the mandrel 200 is caused to rotate thereby causing the gripper jaw 254 to move along this cam surface and close during the clockwise rotation of the mandrel 200. As can be seen in FIG. 8, as the gripper jaw 254 is closed, the free end portions of the clamp tail are tightly held in the wave shape between the gripper jaw 254 and the jaw portion 238 of the mandrel 200.

With respect to providing an indication of the open position associated with the gripper mechanism 242, home position sensor 94 is employed. In one embodiment, this home position sensor 94 or switch is located in the thrust plate 172 (FIG. 4). Essentially, when the mandrel 200 is located at the predetermined home position, as controlled using the electric motor 72, the home position sensor 94 detects this mandrel position and the signal output from the home position sensor 94 is then processed or analyzed using the processing/logic circuitry 90.

As will be further described later herein in connection with representative operations of the apparatus 30, generally, the clamp tail is wrapped about the outer surface 234 of the mandrel 200 as it is rotated until the predetermined or desired tension in the band clamp 34 is reached. After the desired tension is achieved, the clamp tail can be cut or severed from remaining portions of the band clamp 34. In that regard, with reference again to FIG. 3, the band cutting assembly 50 includes an actuator assembly 300 that includes an actuator arm 304 and an actuator drive or motor 308. An actuator bracket 312 connects the actuator assembly 300 to the tool frame 176. The band cutting assembly 50 also includes a band cutting device. In a preferred embodiment, the band cutting device is removably connected to the actuator arm 304 and the mandrel housing 266. In accordance with this embodiment, the cutting device can be a selected one of a number of cutting devices 320a, 320b . . . As depicted in FIG. 3, three of such cutting devices 320 are noted and referenced as 320a, 320b, 320c. Each of these cutting devices 320 has a body or link member 324a, 324b, 324c, respectively. The upper end of the link member 324a, 324b, 324c can be removably connected to the end of the actuator arm 304. The opposite end of these link members 324a,b,c is joined to a cutting head 328a, 328b, 328c, respectively. The essential difference among the cutting devices 320 resides in the cutting and/or locking action that occurs in the band clamp 34 after it has been desirably tensioned and the clamp tail is to be cut off and a lock formed so that the band clamp 34 is properly held to the hose or other object. In the illustrated embodiment, the cutting device 320a provides the first type of lock having a generally J-shaped profile formed against the front face of the buckle of the band clamp 34 and results in a relatively short lip after the cut is made and the lock is formed. The cutting device 320b provides the second type of cutting action and lock by which a shearing is performed against the inside of the buckle, with the second type of lock being able to be formed with a pre-formed band clamp or a clamp having a free end that is looped about the object to be clamped. The cutting device 320c provides a third type of lock and severing operation characterized by center punching the band through a center hole located in the buckle of the band clamp 34. For more information related to one or more of these types of locks, reference is made to U.S. Pat. No. 5,566,726 issued Oct. 22, 1996 entitled "Adaptable Banding Tool" and assigned to the same assignee as the present application, which is hereby incorporated by reference in its entirety.

Figure 11:
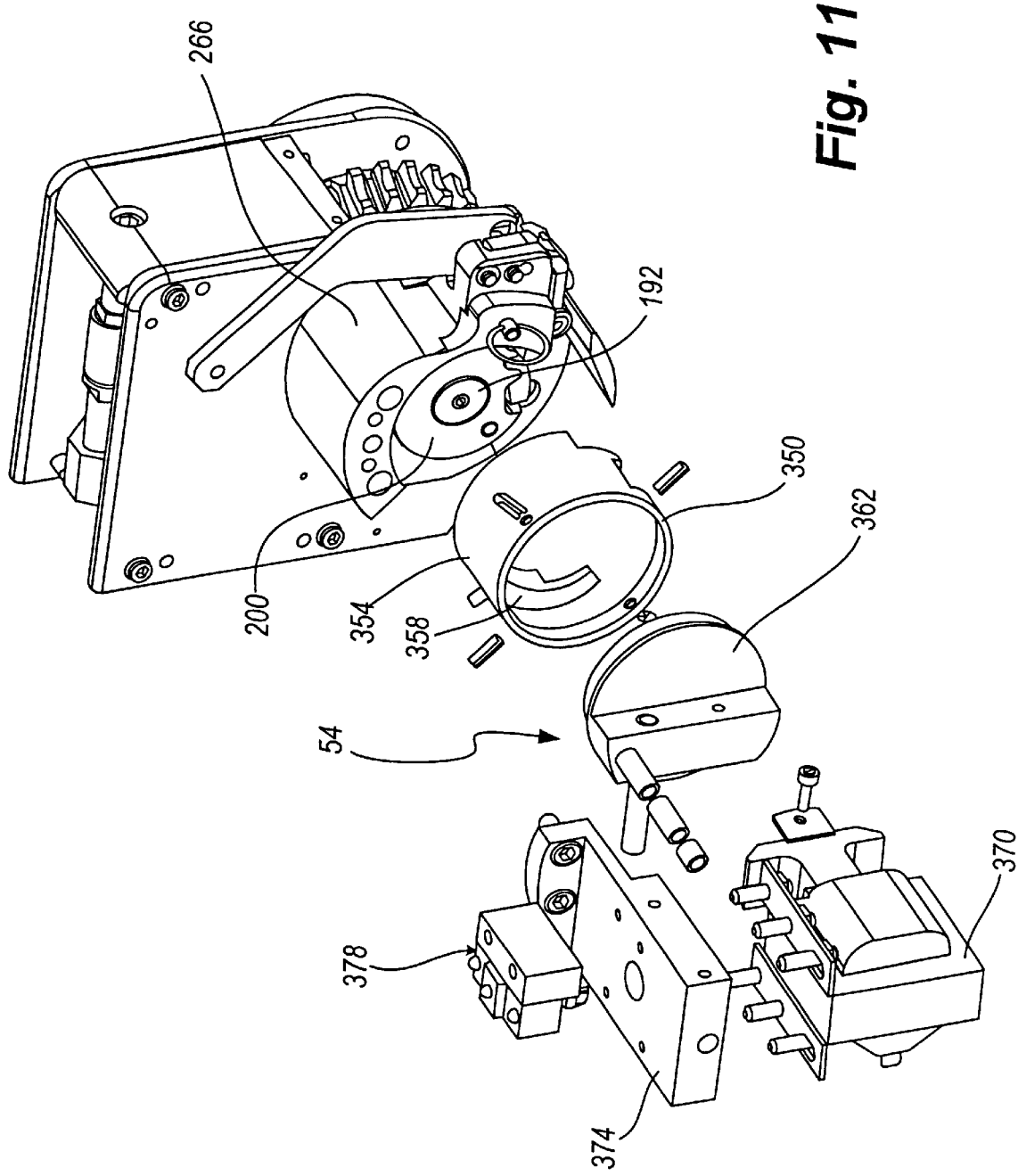
FIG. 11 is an exploded view that illustrates the band ejection assembly in relation to the band tightening assembly.
Figure 12:
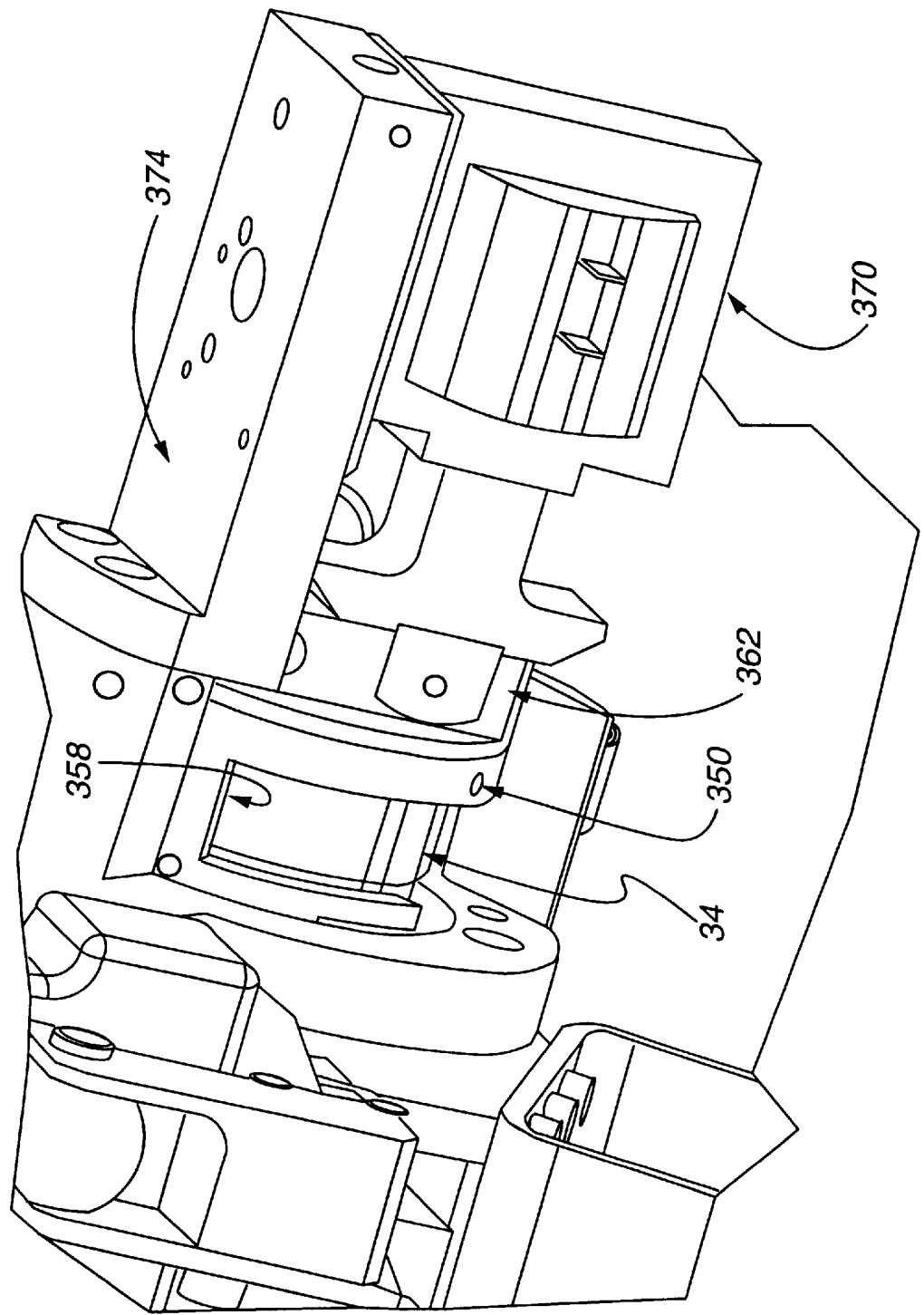
FIG. 12 is an enlarged, perspective view of the band ejection assembly in a first position relative to the mandrel during which the band clamp is being tightened.
Figure 13:
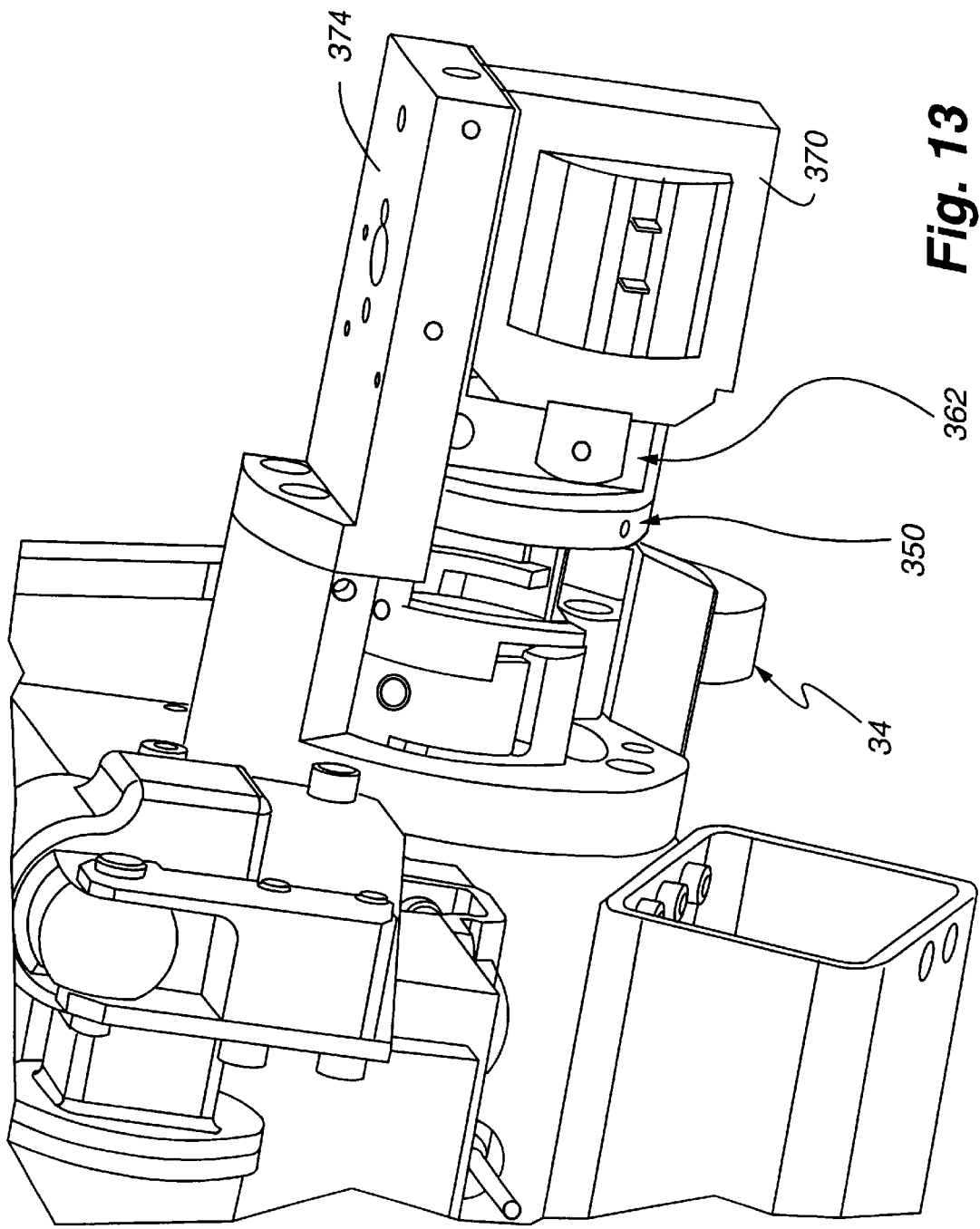
FIG. 13 is a perspective view that diagrammatically illustrates the band ejection assembly in a second position during which the clamp tail is removed from the apparatus.

With reference to FIGS. 11–13, the description of the present invention is continued directed to the band ejection assembly 54 that is involved with removal of the clamp or band tail after it has been severed using the band cutting assembly 50 and after tightening of the band clamp 34 using the band tightening assembly 46, all of which can be controlled using the control system 42. The band ejection assembly 54 includes an ejector cup 350 having a circular outer face 354 with an open area or slot 358 formed therein. The slot 358 has dimensions or a size that allows for the desired, controlled escape or removal of the clamp tail after it is severed. The ejector cup 350 has two main positions. In a first position, it is located intermediate the mandrel housing 266 and the outer periphery 234 of the mandrel 200. In the second position, the ejector cup 350 is moved sideways relative to the mandrel 200 in connection with the removal of the clamp tail, as will be further discussed in the context of representative operations of the apparatus 30. The band ejection assembly 54 also has an ejector plate 362 that is fixedly connected to, or can be integral with, the ejector cup 350. The ejector plate 362 is useful in connecting an ejection solenoid 370 to the ejector cup 350. Ejection solenoid 370 is activated or is otherwise under the control of the control assembly 58. A solenoid bracket 374 is joined to the ejection solenoid 370. An ejector limit switch 378 is mounted to the solenoid bracket 374. Generally, when the ejection solenoid 370 is activated, the ejector cup 350 is caused to move sideways as part of the operation involving the ejection of the clamp tail from the apparatus 30. In that regard, reference is made to FIGS. 12 and 13, which illustrate the two positions associated with the ejector cup 350 and the components connected thereto. FIG. 12 shows the ejector cup 350 including the slot 358 overlying the mandrel 200 during the tensioning of the band clamp 34 including its clamp tail. In this position, portions of the band clamp 34 are wrapped about portions of the outer periphery 234 of the mandrel 200, which wrapping can be less than, equal to or greater than one wrap. As illustrated in FIG. 13, after the severing of the clamp tail by the band cutting assembly 50, the ejection solenoid 370 is activated to pull the ejector cup 350 sideways away from the mandrel 200. In doing so, the severed clamp tail is carried by the ejector cup 350 since the severed clamp tail acts like a clock spring initially disposed between the inner surface of the mandrel housing 266 and the outer periphery 234 of the mandrel 200 and is confined therebetween. Once the ejection solenoid 370 is activated and causes the desired sideways movement, the severed clamp tail is no longer constrained by the mandrel housing 266 so that the clamp tail is able to escape or be removed from the band ejection assembly 54 through the slot 358.

With regard to further descriptions involving the components and operation of the apparatus 30, the operator makes a number of selections or provides a number of inputs, typically when starting a batch of band clamps 34 using the input/output device 62. These inputs include the type of band clamp 34, such as the type of band clamp 34 that has a particular lock and/or cutting operation associated therewith, the width of the band clamp 34 and the material from which the band clamp 34 is made (e.g., one or more kinds of stainless steel or carbon steel). With respect to the band clamp type, the correct cutting device 320 must be in place. One option with the apparatus 30 is to have the cut-off head type sensor 114 that is used to identify the cutting device 320 including its cutting head 328 to check whether the desired or proper cutting device 320 is part of the apparatus 30. The operator also sets the desired or predetermined tension using the key pad 122. This key pad entry is stored in the set point register 78.

In preparing for tightening a particular band clamp 34, the clamp tail is inserted into the cutting head 328. The band guide roller 274 is used to prevent the clamp tail from going under the gripper jaw 254 of the gripper mechanism 242. The clamp tail extends between the wave-shaped surface of the gripper jaw 254 and the mating or corresponding surface of the jaw portion 238. A surface in the mandrel 200 prevents a clamp tail that is too long from extending through a side of the mandrel 200 and is identified as the clamp tail stop.

Once the band clamp 34, particularly its clamp tail, is properly positioned and the parameters or other information associated with tightening the band clamp 34 are input by the operator, the foot switch 126 is activated using the operator's foot so that the motor drive assembly 70, particularly the electric motor 72 is turned on, and the motor shaft's rotation is transmitted through the gear reducer 150 to the coupling assembly 164 and then to the worm drive 180. The worm drive 180 causes the worm gear 184 to rotate, which in turn rotates the drive or gear shaft 188 and the mandrel 200 connected thereto. When the mandrel 200 rotates, it pulls on the gripper mechanism 242 by means of the gripper pivot pin 246. With the mandrel 200 in the home position at the start of the band tightening or tensioning operation, the gripper roller 258 is resting in that part of the cam surface associated with the mandrel housing 266 that forces open the gripper mechanism 242 using the gripper spring 280. As the shaft of the electric motor 72 continues to rotate and the mandrel 200 continues to turn, the gripper roller 258 moves along the race 262 or the continuing cam surface in the mandrel housing 266 to force the gripper jaw 254 of the gripper mechanism 242 to close and to form the clamp tail into the wave shape. Such a configuration for gripping insures that the clamp tail is strongly held so that it can be pulled on. From this point on, the gripper mechanism 242 is kept in its closed position as the gripper roller 258 rides in the race 262 machined into the mandrel housing 266. As the band clamp 34 is being tensioned, the tension monitoring device 74, such as the load cell 210, is monitoring the magnitude of the tension due to the band clamp's resistance. The output of the load cell 210 is applied to the signal conditioning circuitry 86 whose output signal is indicative of the actual tension then being applied to the band clamp 34. The processing/logic circuitry 90 compares the desired tension magnitude stored, for example, in the set point register 78 with the magnitude of the actual tension currently being obtained using the load cell 210. As the band clamp 34 continues to be tightened as the mandrel 200 rotates, the clamp tail wraps about the outer periphery 234 of the mandrel 200 and can continue to wrap around or be located about this surface including one or more wraps or portions thereof. In a normal operation, eventually the actual tension of the band clamp 34 as measured by the load cell 210 becomes equal to, or substantially equal to, the desired tension stored in the set point register 78. When this occurs, the motor drive assembly 70 such as the electric motor 72 thereof is de-activated. Once the proper tension is achieved and the electric motor 72 is shut off, the actuator assembly 300 of the band cutting/locking assembly 50 is activated whereby the actuator arm 304 extends causing desired movement and operation of the cutting device 320. For a first type of cutting device, such as the cutting device 320*a*, the band clamp 34 having the clamp tail to be severed is released a short distance (e.g. 0.050 inch) using a reversal in direction of the motor 72. The operator then moves or rolls up this particular band clamp 34 before the cutting operation occurs. After the operator roll-up movement, the cutting/locking assembly 50 is activated and the clamp tail is cut off.

After cutting off the clamp tail, the actuator arm 304 returns to its previous position and the mandrel 200 returns to its home position. Once the gripper mechanism 242 is in the home position, the ejection solenoid 370 is energized and the ejector cup 350 strips the severed band tail from the mandrel 200.

During the tensioning operation, the load cell 210 tension associated with the worm drive 180 increases as the electric motor 72 pulls until the desired tension is reached. The load cell 210 can be calibrated using an external calibration device to maintain accurate readings. Output tension readings from the load cell 210 can be displayed on the visual display 130, such as the LCD, and/or such readings could be printed from a printer port. It is preferred that the motor 72 run slower as the desired tension is approached in order to avoid overrunning and reaching a greater tension than desired. A switch closure across two a high impedance input terminals for the motor drive assembly 70 reduces the electric motor 72 speed. A comparator in the processing/logic circuitry 90 monitors the tension value. When the tension is equal to a preset percentage of the magnitude of the desired or predetermined tension, the slow-speed switch closes and the motor 72 continues to run until 100% of the magnitude of the desired tension is reached. At the reaching of the desired tension, a first, relatively pleasant, audible (e.g. buzzer) sound occurs for a predetermined time duration, such as one second and a red LED of the visual displays 130 is illuminated. If the actual tension is not within 5% of the input, desired tension, the audible indicators 134 output a relatively unpleasant sound (e.g. buzzer) and the visual display 130 outputs a message such as "overtensioned" or "undertensioned", whichever is applicable.

After the desired tension is reached and the clamp tail is cut off, this is sensed by the tension associated with the load cell 210 dropping to less than a predetermined value, such as 150 pounds. After cutting of the band tail is sensed, the electric motor 72 is automatically turned on and runs until the home position sensor 94 indicates that the mandrel 200 and all components associated therewith have reached the home position. A delay takes place, e.g., about one second, and then the band ejection assembly 54 is activated including energizing the ejection solenoid 370. Such energization occurs for a pre-set time, such as about 1.3 seconds. If full ejection of the ejection solenoid 370 is detected by the ejection solenoid sensor 102 after the predetermined time of energization, the visual display 130 outputs a message to that effect and a green LED of the visual displays 130 illuminates. If full retraction of the ejection solenoid 370 is not detected or the removed clamp tail is not detected, the visual displays 130 and the audible indicators 134 can so indicate. If the ejection solenoid 370 is not at the desired or home position, the apparatus 30 discontinues operation to prevent jamming by the clamp tail that could be pinched between the ejector cup 350 and the mandrel 200. After any such jamming is cleared and the ejection solenoid 370 is de-energized after the ejection cycle, a spring in the ejection solenoid 370 pushes the ejector cup 350 and the ejector plate 362 back to the home position overlying the outer surface 234 of the mandrel 200.

The apparatus 30 may have the ability to handle many various types of hoses or other objects to be clamped, as well as different band clamps 34 requiring different tensioning procedures for each different band clamp. The type of hose or other object being clamped and the type of band clamp itself can be input by the user by means of the key pad 122. The types of hoses that might be accounted for include a hard rubber-like hose, a soft rubber-like hose and a solid or metal pipe. Different tensioning procedures can include a variable pull-up speed, pauses in tensioning, such as used with the relatively soft host, temporary motor reversing that is used with a certain type of clamp and variable tensioning on the same band clamp.

With regard to more information concerning the monitoring of events that can occur during any particular cycle during which a band clamp 34 is tightened, its clamp tail severed, and the clamp tail ejected, the following is provided. As previously noted, in one embodiment, the foot switch 126 must remain in a predetermined position during the entire cycle. The foot switch 126 is disabled if the ejection solenoid 370 and/or cutting device sensorl 10 indicates that the cutting device 320 is not in its home position. When the cutting device 320 is not at its home position, the visual displays 130 can provide a message such as "return cutting device home" and the audible indicators 134 can also provide an audible indication to that effect. When the cutting device sensor 110, the home position sensor 94 and the ejection solenoid sensor 102 indicate that the components they monitor are in the home position, the visual displays 130 can so indicate. On the other hand, if one or more of them is not in its home position, the audible indicators 134 and/or visual displays 130 can indicate this condition. For example, if the mandrel 200 is not in its home position and the tension being read is less than a predetermined tension, such as 100 lbf, the visual displays 130 indicate that the apparatus 30 is not ready for operation. The foot switch 126 can be used to return the mandrel 200 to its home position. Once at the home position, the foot switch 126 must be released and pressed again to advance the mandrel 200.

If the mandrel 200 is not at the home position, band clamp tension is over a predetermined magnitude, such as 100 lbf, the ejection solenoid 370 is in its home position, the previous band tail has been ejected, and the cutting device 320 is in its home position, the visual displays 130, such as the LCD, indicate that the apparatus 30 is conducting the "tensioning" operation. If the actual tension as measured by the load cell 210 is under 100 lbf, the band tightening assembly 46 is determined as being operated without a band clamp 34 inserted therein. In such a case the foot switch 126 can be used to activate the motor 72 so that the mandrel 200, together with the associated components that are used to drive the mandrel 200 to the home position, are caused to move until the home position is detected by the home position sensor 94.

Generally, the motor 72 is controlled so that it stops and its motor shaft discontinues any rotation when the home position sensor 94 provides an indication that the home position has been reached. However, there are two cases where the motor 72 does not stop. When a relatively long band clamp 34 is being tensioned, more than one rotation of the drive shaft 188 and the mandrel 200 may be required whereby there is more than one wrap of the clamp tail about the outer surface 234 of the mandrel 200. In this case, the processing/logic circuitry 90 determines that the output signal from the home position sensor 94 indicating that the home position is reached is to be ignored and is not used to de-activate the motor 72 when the actual tension being measured is greater than a predetermined tension value, such as 200 pounds. If the actual tension being measured is higher than such a predetermined tension, a determination is made that the band clamp 34 is in the process of being tensioned so that the motor 72 will continue to run.

The second case for not stopping the motor 72 at the home position occurs after cutting off the clamp tail when certain conditions are present. The particular band clamp 34 may be tensioned to the desired tension just before the home position sensor 94 would indicate that the home position is reached. After the clamp tail is cut, the motor 72 must pull the clamp tail free of the cutting device 320 before it can be ejected. If the home position sensor 94 detects the home position shortly after the motor 72 restarts, the clamp tail will not yet be cleared to eject it, but the home position sensor 94 provides an output to the processing/logic circuitry 90 to the effect that the motor 72 should be stopped. When such a situation occurs, the output from the motor run timer 98 is relied on. Specifically, the output of the motor run timer 98 indicates the time that the motor 72 has been running since it was last activated and the motor run timer 98 is reset every time the motor 72 stops. The motor run timer 98 has a pre-set value, such as about 1 second. If the home position sensor 94 senses the home position and the motor 72 has been running less than this preset time, the motor 72 automatically continues to run for another revolution.

Figure 14:
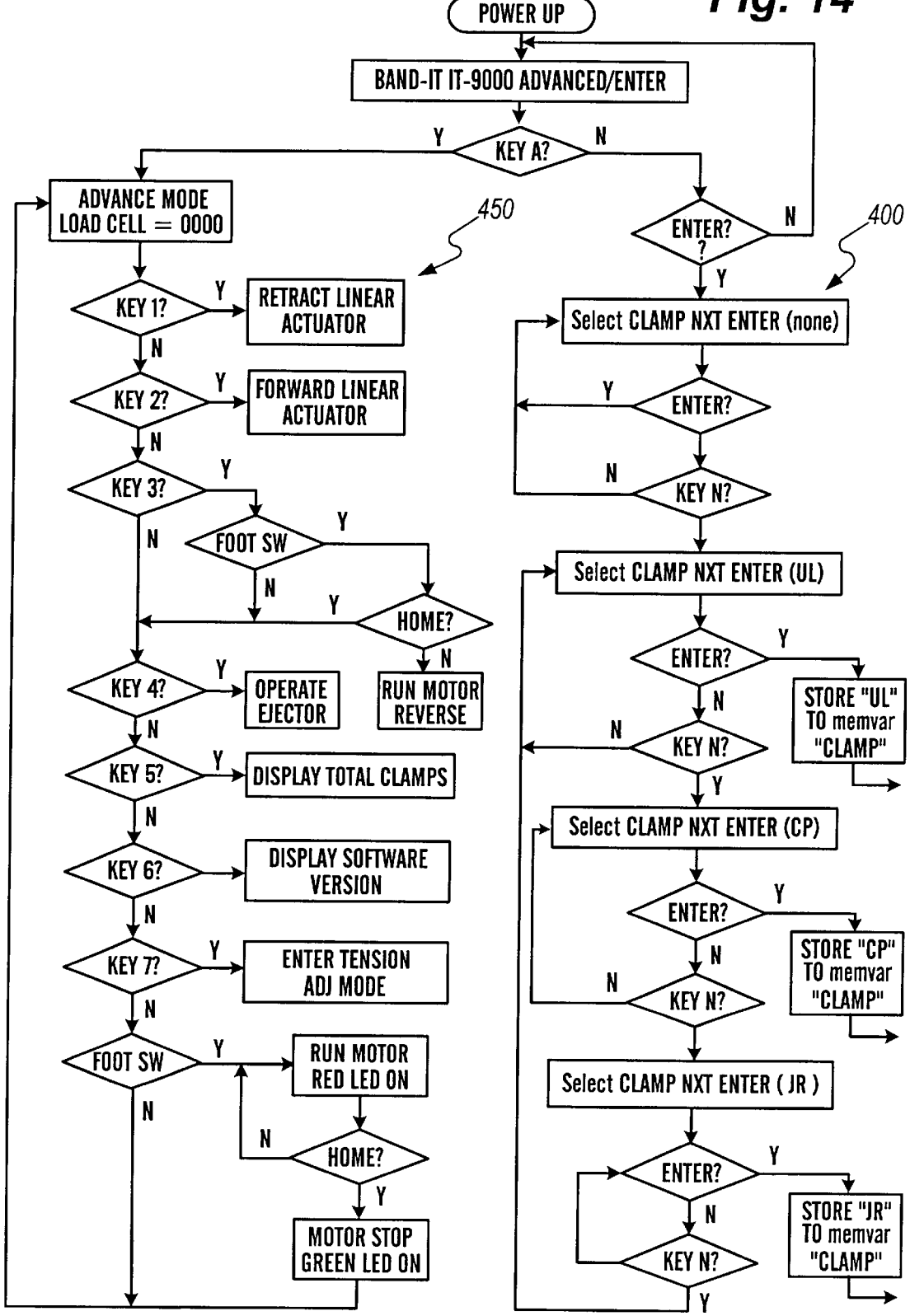
FIG. 14 is a flow diagram that illustrates steps related to providing and obtaining information related to operation of the apparatus.
Figure 15:
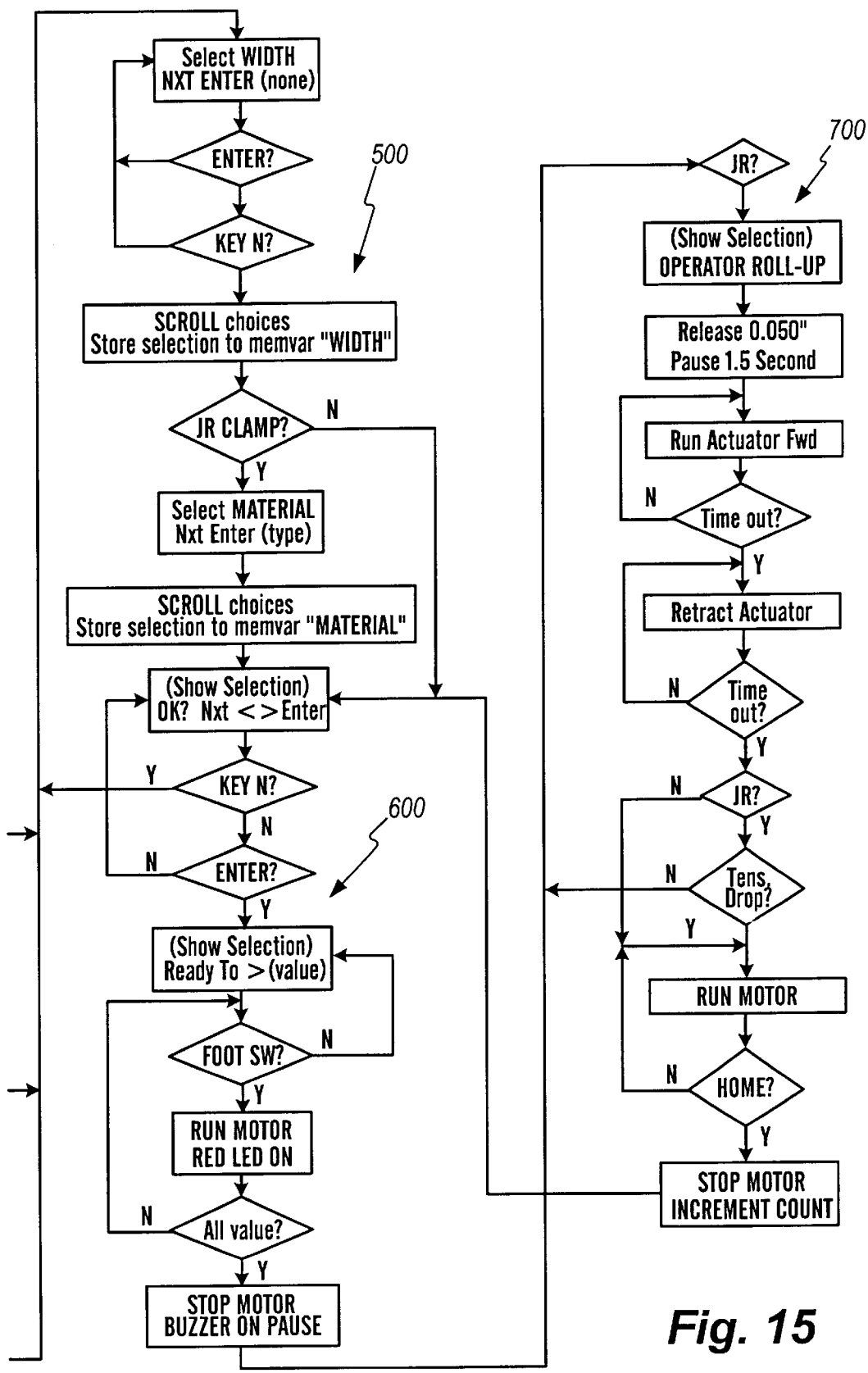
FIG. 15 is a flow diagram that illustrates steps related to the tensioning, cutting/locking and clamp tail removal operations of the apparatus.

With reference to FIGS. 14 and 15, further information related to the operation of the apparatus 30 is provided. As depicted in FIG. 14, two general modes of operation can be employed. According to steps 400, the apparatus 30 is utilizing the usual or normal operational steps associated with tightening one or more band clamps 34. As part of such steps, the type of band clamp is selected. In this illustrated embodiment, the band clamp 34 being selected for tensioning is selected from three different types of band clamps identified as: "UL" (ULTRA-LOK), "CP" (CENTER PUNCH) and "JR" (JUNIOR). As shown in FIG. 15, as part of the type of band clamp selection, the width of the band clamp 34 to be tensioned is also selected. For the JR band clamp, a material selection is made, such as whether this band clamp is made of stainless steel or carbon steel, with these steps being generally identified as 500. After such selections are made, the motor 72 can be operated using the foot switch 126 until the desired tension is reached, as generally represented by steps 600. After the desired tension is reached, the cutting steps 700 are employed including a determination as to whether the JR type of band clamp 34 is being tensioned. If so, the previously described roll-up movement is conducted including release of the band clamp tightening a predetermined distance using the reverse motor switch 142 that causes the motor 72 to turn its motor shaft in a reverse direction. Returning to FIG. 14, other operational steps can be utilized in an advance mode that can include calibration of the apparatus 30, as generally depicted by the steps 450. Such operational steps can include movement of the cutting device 320 of the band cutting/locking assembly 50, causing the mandrel 200 to rotate to its home position, enabling the operator to operate the ejection solenoid 370, and/or displaying a total number of band clamps that have been tensioned.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments discussed hereinabove are further intended to explain the best mode known of practicing the inventions and to enable others skilled in the art to utilize the inventions in such, or in other embodiments and with the various modifications required by their particular applications or uses of the inventions. It is intended that the appended claims be construed to include alternative embodiments to the extent permitted by the prior art.

What is claimed is:

1. A method for tightening a band clamp about an object, comprising:

inputting a first magnitude related to a desired tension associated with the band clamp about the object;

tightening the band clamp about the object after positioning the band clamp thereabout using an electric motor including a motor input, a motor output and a motor;

outputting an electric actual tension signal having a second magnitude related to actual tension of the band clamp, said outputting step including obtaining said electric actual tension signal at a location after said motor, including said location being different from said motor input; and determining using circuitry whether said desired tension is obtained using said actual tension signal.

2. A method, as claimed in claim 1, wherein:

said tightening step includes moving a mandrel about which the band clamp is wrapped.

3. A method, as claimed in claim 2, wherein:

said tightening step includes varying a speed associated with movement of said mandrel depending upon said actual tension.

4. A method, as claimed in claim 2, further including:

checking whether a threshold tension is achieved during a cycle associated with operation of said electric motor.

5. A method, as claimed in claim 1, wherein:

said outputting step includes utilizing a load cell operably associated with the band clamp.

6. A method, as claimed in claim 1, further including:

calibrating a tension monitoring device, which is used in outputting said actual tension signal, before said tightening step is conducted.

7. A method, as claimed in claim 1, wherein:

said outputting step includes using a device, which is different from the band clamp and the object, joined to said motor output.

8. A method for tightening a band claim about an object, comprising:

inputting a first magnitude related to a desired tension associated with the band clamp about the object;

tightening the band clamp about the object after positioning the band clamp thereabout, said tightening step including using an electric motor to move a mandrel about which the band clamp is wrapped and ascertaining whether a home position associated with said mandrel is reached;

outputting an electric actual tension signal having a second magnitude related to actual tension of the band clamp; and determining using circuitry whether said desired tension is obtained using said actual tension signal.

9. A method for tightening a band clamp about an object, comprising:

inputting a first magnitude related to a desired tension associated with the band clamp about the object;

tightening the band clamp about the object after positioning the band clamp thereabout;

outputting an electric actual tension signal having a second magnitude related to actual tension of the band clamp;

determining using circuitry whether said desired tension is obtained using said actual tension signal; and cutting a band tail from the band clamp and ejecting the band tail by moving at least portions of an ejection assembly substantially laterally.

10. A method for tightening a band clamp about an object, comprising:

inputting a first magnitude related to a desired tension associated with the band clamp about the object;

tightening the band clamp about the object after positioning the band clamp thereabout;

outputting an electric actual tension signal having a second magnitude related to actual tension of the band clamp;

determining using circuitry whether said desired tension is obtained using said actual tension signal; and severing a band tail from the band clamp after said tightening step and ejecting the band tail, with the band tail having substantially curved portions at least when said ejecting step is being conducted.

11. A method for tightening a band clamp about an object, comprising:

inputting a first magnitude related to a desired tension associated with the band clamp about the object;

tightening the band clamp about the object after positioning the band clamp thereabout;

outputting an electric actual tension signal having a second magnitude related to actual tension of the band clamp;

determining using circuitry whether said desired tension is obtained using said actual tension signal;

defining a home position;

defining an override tension;

detecting said home position during said tightening step;

determining that said actual tension is at least equal to said override tension; and continuing said tightening step.

12. A method for tightening a band clamp about an object, comprising:

inputting a first magnitude related to a desired tension associated with the band clamp about the object;

tightening the band clamp about the object after positioning the band clamp thereabout;

outputting an electric actual tension signal having a second magnitude related to actual tension of the band clamp;

determining using circuitry whether said desired tension is obtained using said actual tension signal; and associating a predetermined run time with said electric motor used in tightening the band clamp and ascertaining whether said predetermined run time is exceeded and, when not exceeded, continuing to power said electric motor.

13. A method for tightening a band clamp, comprising:

positioning a band clamp to be tightened about an object;

providing at least portions of the band clamp about a mandrel using an electric motor to tighten the band clamp about the object to a desired tension; and associating a home position with said mandrel and establishing an open position of a gripper mechanism of a band tightening assembly when said mandrel is associated with said home position.

14. A method, as claimed in claim 13, wherein:

said providing step includes creating a curved band tail and, after the band clamp is tightened to said desired tension, the band tail is cut and moved relative to said mandrel.

15. A method, as claimed in claim 13, wherein:
said providing step includes obtaining a magnitude related to actual tension of the band clamp using a tension monitoring device and comparing said magnitude related to said actual tension to a magnitude related to said desired tension.

16. A method, as claimed in claim 13, wherein:
said providing step includes causing a gear mechanism to move using said electric motor, with said gear mechanism being operatively associated with said mandrel.

17. A method, as claimed in claim 13, further including:
inputting using an input device information related to the band clamp, with said information including at least one of: a type of the band clamp, a width of the band clamp and a material from which the band clamp is made.

18. A method for tightening a band clamp, comprising:
positioning a band clamp to be tightened about an object;
providing at least portions of the band clamp about a mandrel using an electric motor to tighten the band clamp about the object to a desired tension; and
establishing a home position related to said mandrel and determining whether an override tension is present when said home position is reached after performing at least part of said providing step.

19. A method for tightening a band clamp, comprising:
positioning a band clamp to be tightened about an object;
providing at least portions of the band clamp about a mandrel using an electric motor to tighten the band clamp about the object to a desired tension; and
associating a predetermined run time with said electric motor and determining whether said predetermined run time is exceeded.

20. A method, as claimed in claim 19, wherein:
said determining step is conducted after a tail of the band clamp has been severed and during a step of ejecting the band tail.

21. An apparatus for controlling the connection of a band clamp about an object, comprising:
a banding system for use in joining the band clamp to the object that includes an electric motor used in the joining the band clamp to the object, said electric motor having a motor input, a motor output and a motor; and
a control system for use in controlling the joining of the band clamp to the object, said control system including a device that receives at least a first input related to desired tension of the band clamp about the object and circuitry that determines whether to discontinue tightening of the band clamp;
wherein said circuitry outputs an electric actual tension signal related to actual tension of the band clamp and said electric actual tension signal is obtained at a location after said motor including said location being different from said motor input.

22. An apparatus, as claimed in claim 21, wherein:
said device is an input/output device that receives a plurality of inputs and provides a plurality of outputs related to the joining of the band clamp to the object.

23. An apparatus, as claimed in claim 21, wherein:
said banding system includes a band tightening assembly comprising a mandrel about which at least portions of the band clamp are wrapped.

24. An apparatus, as claimed in claim 23, wherein:
said band tightening assembly includes a gear mechanism operably associated with said electric motor output.

25. An apparatus, as claimed in claim 21 wherein:
said control assembly includes a tension monitoring device that outputs an actual tension signal and in which said circuitry uses said actual tension signal and said first input related to said desired tension to determine whether to discontinue tightening of the band clamp.

26. An apparatus, as claimed in claim 25, wherein:
said tension monitoring device includes a load cell electrically connected to said circuitry.

27. An apparatus, as claimed in claim 21, wherein:
said banding system includes a band tightening assembly comprising a mandrel having a jaw portion and a gripper mechanism having a gripper jaw and in which portions of the band clamp can be held between said gripper jaw and said jaw portion.

28. An apparatus, as claimed in claim 21, wherein:
said banding system includes a band tightening assembly and at least a first band cut-off assembly removably connected to said band tightening assembly and in which said first band cut-off assembly is used to sever a clamp tail from remaining portions of the band clamp.

29. An apparatus for controlling the connection of a band clamp about an object, comprising:
a banding system for use in joining the band clamp to the object that includes a band tightening assembly comprising a mandrel about at which at least portions of the band clamp are wrapped and an electric motor and a gear mechanism operably associated with said electric motor output, said mandrel operably connected to said gear mechanism and with said mandrel being associated with a home position related to beginning a cycle of operation of said electric motor; and
a control system for use in controlling the joining of the band clamp to the object, said control system including a device that receives at least a first input related to desired tension of the band clamp about the object and a control assembly that includes circuitry that determines whether to discontinue tightening of the band clamp.

30. An apparatus, as claimed in claim 29, wherein:
said band tightening assembly includes a gripper mechanism that has an open position and a closed position and in which said gripper mechanism is in said open position when said mandrel is associated with said home position.

31. An apparatus for controlling the connection of a band clamp about an object, comprising:
a banding system for use in joining the band clamp to the object that includes a band tightening assembly comprising a number of gears; and
a control system for use in controlling the joining of the band clamp to the object, said control system including an input/output device that receives a plurality of inputs, including at least a first input related to desired tension of the band clamp about the object and provides a plurality of outputs related to joining the band clamp to the object and a control assembly that includes circuitry that determines whether to discontinue tightening of the band clamp, said control assembly including a tension monitoring device that outputs an actual tension signal and in which said circuitry uses said actual tension signal and said first input related to said desired tension to determine whether to discontinue tightening of the band clamp, said tension monitoring device including a load cell electrically connected to said circuitry, said load cell being positioned substantially parallel to at least one of said gears.

32. An apparatus, as claimed in claim 31, wherein:
said load cell is attached to a thrust member that is joined to said at least one gear and said load cell receives an input related to said actual tension of the band clamp using a force associated with said one gear on said thrust member.

33. An apparatus for controlling the connection of a band clamp about an object, including:
   a banding system for use in joining the band clamp to the object, said banding system including a band tightening assembly and at least a first band cut-off assembly removably connected to said band tightening assembly and in which said first band cut-off assembly is used to sever a clamp tail from remaining portions of the band clamp;
   a second band cut-off assembly that is removably connected to said band tightening assembly when said first band cut-off assembly is not connected to said band tightening assembly and in which said second band cut-off assembly locks and cuts the band clamp differently from said first band cut-off assembly; and
   a control system for use in controlling the joining of the band clamp to the object, said control system including a device that receives at least a first input related to desired tension of the band clamp about the object and a control assembly that includes circuitry that determines whether to discontinue tightening of the band clamp.

34. An apparatus for controlling the connection of a band clamp about an object, comprising:
   a banding system for use in joining the band clamp to the object; and
   a control system for use in controlling the joining of the band clamp to the object, said control system including a device that receives at least a first input related to desired tension of the band clamp about the object and a control assembly that includes circuitry that determines whether to discontinue tightening of the band clamp;
   wherein said banding system includes a band ejection assembly having at least portions that move laterally under control of said control system after the clamp tail is cut from the band clamp.

35. An apparatus, as claimed in claim 34, wherein:
said banding system includes a band tightening assembly having a mandrel and in which said portions of said band ejection assembly are positioned about said mandrel when the band clamp is being tightened about said mandrel and said portions are moved away from said mandrel when the clamp tail is being removed.

36. A method, as claimed in claim 35, wherein:
said device includes a load cell assembly.

* * * * *